US008503650B2

(12) United States Patent
Reding et al.

(10) Patent No.: US 8,503,650 B2
(45) Date of Patent: Aug. 6, 2013

(54) METHODS AND SYSTEMS FOR CONFIGURING AND PROVIDING CONFERENCE CALLS

(75) Inventors: Craig L. Reding, Midland Park, NJ (US); John R. Reformato, East Meadow, NJ (US); Mahesh Rajagopalan, Irving, TX (US); Brian F. Roberts, Lewisville, TX (US); Chris L. Helbling, Stamford, CT (US); Manvinder S. Chopra, Carrollton, TX (US); Ken J. Hum, Arlington, TX (US); Apurva Pathak, Irving, TX (US)

(73) Assignees: Verizon Data Services LLC, Temple Terrace, FL (US); Telesector Resources Group, Inc., New York, NY (US)

( * ) Notice: Subject to any disclaimer, the term of this patent is extended or adjusted under 35 U.S.C. 154(b) by 1400 days.

(21) Appl. No.: 10/720,661

(22) Filed: Nov. 24, 2003

(65) Prior Publication Data

US 2006/0177034 A1   Aug. 10, 2006

Related U.S. Application Data

(63) Continuation-in-part of application No. 10/083,793, filed on Feb. 27, 2002, and a continuation-in-part of (Continued)

(51) Int. Cl.
*H04M 3/42* (2006.01)
(52) U.S. Cl.
USPC ...... 379/202.01; 370/260; 370/261; 709/204; 709/227

(58) Field of Classification Search
USPC ....... 370/260, 261; 709/204, 227; 379/202.01
See application file for complete search history.

(56) References Cited

U.S. PATENT DOCUMENTS

| 4,013,839 | A | | 3/1977 | Bell | |
|---|---|---|---|---|---|
| 4,540,850 | A | * | 9/1985 | Herr et al. | 379/88.19 |

(Continued)

FOREIGN PATENT DOCUMENTS

| CA | 2240878 | 12/1998 |
|---|---|---|
| DE | 10110942 | 9/2002 |

(Continued)

OTHER PUBLICATIONS

"The Mobile Phone User Guide", http://www.mobileshop.org/usertech/wildfire.htm, printed Oct. 1, 2004.

(Continued)

*Primary Examiner* — Quynh H Nguyen

(57) ABSTRACT

Methods and systems for automatically providing conference calls are disclosed. In one aspect of the invention, methods and systems detect a conference call event that was previously configured by a subscriber user and identify participant users associated with the conference call event. Once identified, each participant user is contacted and a response is received from each of the users. Based on the received responses, a conference call is established between the participant users and the subscriber user. In one aspect of the invention, at least one of the detecting and identifying steps are performed without user intervention.

77 Claims, 9 Drawing Sheets

Related U.S. Application Data

(63) application No. 10/083,792, filed on Feb. 27, 2002, now Pat. No. 7,142,646, and a continuation-in-part of application No. 10/083,884, filed on Feb. 27, 2002, now Pat. No. 7,190,773, and a continuation-in-part of application No. 10/083,822, filed on Feb. 27, 2002, and a continuation-in-part of application No. 10/084,121, filed on Feb. 27, 2002, now abandoned.

(60) Provisional application No. 60/272,122, filed on Feb. 27, 2001, provisional application No. 60/272,167, filed on Feb. 27, 2001, provisional application No. 60/275,667, filed on Mar. 13, 2001, provisional application No. 60/275,719, filed on Mar. 13, 2001, provisional application No. 60/272,020, filed on Mar. 13, 2001, provisional application No. 60/275,031, filed on Mar. 13, 2001, provisional application No. 60/276,505, filed on Mar. 19, 2001, provisional application No. 60/428,704, filed on Nov. 25, 2002, provisional application No. 60/436,018, filed on Dec. 26, 2002.

(56) References Cited

U.S. PATENT DOCUMENTS

| | | |
|---|---|---|
| 4,600,814 A | 7/1986 | Cunniff et al. |
| 4,734,931 A | 3/1988 | Bourg et al. |
| 4,924,496 A | 5/1990 | Figa et al. |
| 5,014,303 A | 5/1991 | Velius |
| 5,168,515 A | 12/1992 | Gechter et al. |
| 5,222,125 A | 6/1993 | Creswell et al. |
| 5,274,700 A | 12/1993 | Gechter et al. |
| 5,327,486 A | 7/1994 | Wolff et al. ............... 379/93.23 |
| 5,329,578 A | 7/1994 | Brennen et al. |
| 5,428,663 A | 6/1995 | Grimes et al. |
| 5,440,624 A | 8/1995 | Schoof |
| 5,483,586 A | 1/1996 | Sussman |
| 5,533,096 A | 7/1996 | Bales |
| 5,535,265 A | 7/1996 | Suwandhaputra |
| 5,548,636 A | 8/1996 | Bannister et al. |
| 5,550,907 A | 8/1996 | Carlsen |
| 5,583,564 A | 12/1996 | Rao et al. |
| 5,586,173 A | 12/1996 | Misholi et al. |
| 5,588,037 A | 12/1996 | Fuller et al. |
| 5,608,788 A | 3/1997 | Demlow et al. |
| 5,619,555 A | 4/1997 | Fenton et al. |
| 5,621,787 A | 4/1997 | McKoy et al. |
| 5,623,541 A | 4/1997 | Boyle et al. |
| 5,631,904 A | 5/1997 | Fitser et al. ............... 370/261 |
| 5,638,434 A * | 6/1997 | Gottlieb et al. ........... 379/203.01 |
| 5,649,105 A | 7/1997 | Aldred et al. |
| 5,652,789 A | 7/1997 | Miner et al. ............... 379/201 |
| 5,661,788 A | 8/1997 | Chin |
| 5,668,863 A | 9/1997 | Bieselin et al. |
| 5,673,080 A | 9/1997 | Biggs et al. |
| 5,692,213 A | 11/1997 | Goldberg et al. |
| 5,710,591 A | 1/1998 | Bruno et al. |
| 5,712,903 A | 1/1998 | Bartholomew et al. |
| 5,715,444 A | 2/1998 | Danish et al. |
| 5,717,863 A | 2/1998 | Adamson et al. |
| 5,719,925 A | 2/1998 | Peoples |
| 5,724,412 A | 3/1998 | Srinivasan |
| 5,742,095 A | 4/1998 | Bryant et al. |
| 5,742,668 A | 4/1998 | Pepe et al. |
| 5,742,905 A | 4/1998 | Pepe et al. |
| 5,745,561 A | 4/1998 | Baker et al. |
| 5,745,884 A | 4/1998 | Carnegie et al. |
| 5,751,800 A | 5/1998 | Ardon |
| 5,752,191 A | 5/1998 | Fuller et al. |
| 5,764,901 A | 6/1998 | Skarbo et al. |
| 5,805,670 A | 9/1998 | Pons et al. |
| 5,841,837 A | 11/1998 | Fuller et al. |
| 5,864,603 A | 1/1999 | Haavisto et al. |
| 5,872,841 A | 2/1999 | King et al. |
| 5,875,242 A | 2/1999 | Glaser et al. ............... 379/207 |
| 5,875,437 A | 2/1999 | Atkins |
| 5,903,845 A | 5/1999 | Buhrmann et al. ........... 455/461 |
| 5,907,324 A | 5/1999 | Larson et al. |
| 5,907,547 A | 5/1999 | Foladare et al. ............ 370/352 |
| 5,917,817 A | 6/1999 | Dunn et al. |
| 5,917,912 A | 6/1999 | Ginter et al. |
| 5,920,826 A | 7/1999 | Metso et al. |
| 5,920,847 A | 7/1999 | Kolling et al. |
| 5,926,535 A | 7/1999 | Reynolds |
| 5,944,769 A | 8/1999 | Musk et al. |
| 5,945,989 A | 8/1999 | Freishtat et al. |
| 5,960,342 A | 9/1999 | Liem et al. |
| 5,963,925 A | 10/1999 | Kolling et al. |
| 5,982,870 A | 11/1999 | Pershan et al. |
| 6,005,870 A | 12/1999 | Leung et al. |
| 6,018,571 A | 1/2000 | Langlois et al. |
| 6,018,737 A | 1/2000 | Shah et al. |
| 6,021,428 A | 2/2000 | Miloslavsky |
| 6,029,151 A | 2/2000 | Nikander |
| 6,031,896 A | 2/2000 | Gardell et al. |
| 6,041,103 A | 3/2000 | La Porta et al. |
| 6,052,372 A | 4/2000 | Gittins et al. |
| 6,058,163 A | 5/2000 | Pattison et al. |
| 6,061,432 A | 5/2000 | Wallace et al. |
| 6,078,658 A | 6/2000 | Yunoki |
| 6,092,102 A | 7/2000 | Lefeber et al. |
| 6,100,882 A | 8/2000 | Sharman et al. |
| 6,122,348 A | 9/2000 | French-St. George et al. |
| 6,134,318 A | 10/2000 | O'Neil |
| 6,134,548 A | 10/2000 | Gottsman et al. |
| 6,144,671 A | 11/2000 | Perinpanathan et al. |
| 6,154,646 A | 11/2000 | Tran et al. |
| 6,161,008 A | 12/2000 | Lee et al. |
| 6,163,692 A * | 12/2000 | Chakrabarti et al. ......... 455/416 |
| 6,167,119 A | 12/2000 | Bartholomew et al. |
| 6,188,756 B1 | 2/2001 | Mashinsky |
| 6,189,026 B1 | 2/2001 | Birrell et al. |
| 6,192,123 B1 | 2/2001 | Grunsted et al. ............ 379/350 |
| 6,195,660 B1 | 2/2001 | Polnerow et al. |
| 6,215,863 B1 | 4/2001 | Bennett et al. |
| 6,219,413 B1 | 4/2001 | Burg ....................... 379/215.01 |
| 6,226,374 B1 | 5/2001 | Howell et al. ................. 379/207 |
| 6,240,449 B1 | 5/2001 | Nadeau |
| 6,260,050 B1 | 7/2001 | Yost et al. |
| 6,275,575 B1 * | 8/2001 | Wu ......................... 379/202.01 |
| 6,282,522 B1 | 8/2001 | Davis et al. |
| 6,296,062 B1 | 10/2001 | Gardell et al. |
| 6,298,129 B1 | 10/2001 | Culver et al. |
| 6,301,338 B1 | 10/2001 | Makela et al. |
| 6,301,609 B1 | 10/2001 | Aravamudan et al. ........ 709/207 |
| 6,310,939 B1 | 10/2001 | Varney |
| 6,310,947 B1 | 10/2001 | Polcyn ..................... 379/211.01 |
| 6,324,269 B1 | 11/2001 | Malik |
| 6,333,973 B1 | 12/2001 | Smith et al. |
| 6,349,299 B1 | 2/2002 | Spencer et al. |
| 6,351,279 B1 | 2/2002 | Sawyer |
| 6,363,143 B1 | 3/2002 | Fox |
| 6,371,484 B1 | 4/2002 | Yuan |
| 6,373,817 B1 | 4/2002 | Kung et al. |
| 6,373,930 B1 | 4/2002 | McConnell et al. |
| 6,385,754 B1 | 5/2002 | Mizumoto et al. |
| 6,389,113 B1 | 5/2002 | Silverman |
| 6,404,873 B1 | 6/2002 | Beyda et al. |
| 6,408,191 B1 | 6/2002 | Blanchard et al. |
| 6,408,327 B1 | 6/2002 | McClennon et al. |
| 6,411,605 B1 | 6/2002 | Vance et al. |
| 6,418,214 B1 | 7/2002 | Smythe et al. |
| 6,430,176 B1 | 8/2002 | Chrstie |
| 6,430,289 B1 | 8/2002 | Liffick ....................... 379/900 |
| 6,434,226 B1 | 8/2002 | Takahashi |
| 6,442,245 B1 | 8/2002 | Castagna et al. |
| 6,442,251 B1 | 8/2002 | Maes et al. |
| 6,442,748 B1 | 8/2002 | Bowman-Amuah |
| 6,453,031 B2 | 9/2002 | Malik |
| 6,453,167 B1 | 9/2002 | Michaels et al. |
| 6,459,780 B1 | 10/2002 | Wurster et al. ............ 379/142.02 |
| 6,459,913 B2 | 10/2002 | Cloutier |
| 6,463,145 B1 | 10/2002 | O'Neal et al. ............. 379/211.02 |

| Patent | Date | Inventor(s) |
|---|---|---|
| 6,463,464 B1 | 10/2002 | Lazaridis et al. |
| 6,466,910 B1 | 10/2002 | Desmond et al. |
| 6,470,079 B1 | 10/2002 | Benson |
| 6,473,615 B1 | 10/2002 | Theppasandra et al. |
| 6,477,374 B1 | 11/2002 | Shaffer et al. ................. 455/445 |
| 6,480,830 B1 | 11/2002 | Ford et al. |
| 6,480,890 B1 | 11/2002 | Lee, Jr. et al. |
| 6,507,644 B1 | 1/2003 | Henderson et al. |
| 6,519,326 B1 | 2/2003 | Milewski et al. |
| 6,522,734 B1 | 2/2003 | Allen et al. |
| 6,526,134 B1 | 2/2003 | Wallenius |
| 6,532,285 B1 | 3/2003 | Tucker et al. |
| 6,535,596 B1 | 3/2003 | Frey et al. |
| 6,539,082 B1 | 3/2003 | Lowe et al. |
| 6,542,596 B1 | 4/2003 | Hill et al. |
| 6,546,005 B1 | 4/2003 | Berkley et al. ................. 370/353 |
| 6,547,830 B1 | 4/2003 | Mercer |
| 6,560,329 B1 | 5/2003 | Draginich et al. |
| 6,563,914 B2 | 5/2003 | Sammon et al. |
| 6,564,261 B1 | 5/2003 | Gudjonsson et al. ......... 709/227 |
| 6,574,324 B1 | 6/2003 | Malik |
| 6,574,470 B1 | 6/2003 | Chow et al. |
| 6,577,622 B1 | 6/2003 | Schuster et al. .............. 370/352 |
| 6,577,720 B1 | 6/2003 | Sutter |
| 6,584,122 B1 | 6/2003 | Matthews et al. ............. 370/493 |
| 6,590,603 B2 | 7/2003 | Sheldon et al. |
| 6,590,969 B1 | 7/2003 | Peters et al. |
| 6,593,352 B2 | 7/2003 | Smith |
| 6,594,470 B1 | 7/2003 | Barnes et al. |
| 6,600,736 B1 | 7/2003 | Ball et al. |
| 6,609,113 B1 | 8/2003 | O'Leary et al. |
| 6,611,590 B1 | 8/2003 | Lu et al. |
| 6,614,786 B1 | 9/2003 | Byers ............................ 370/353 |
| 6,618,710 B1 | 9/2003 | Zondervan et al. |
| 6,625,258 B1 | 9/2003 | Ram et al. |
| 6,628,194 B1 | 9/2003 | Hellebust et al. |
| 6,628,770 B1 | 9/2003 | Jain et al. |
| 6,631,186 B1 | 10/2003 | Adams et al. |
| 6,636,587 B1 | 10/2003 | Nagai et al. |
| 6,643,356 B1 | 11/2003 | Hickey et al. |
| 6,654,768 B2 | 11/2003 | Celik |
| 6,661,340 B1 | 12/2003 | Saylor et al. |
| 6,665,388 B2 | 12/2003 | Bedingfield |
| 6,668,046 B1 | 12/2003 | Albal |
| 6,668,049 B1 | 12/2003 | Koch et al. |
| 6,681,119 B1 | 1/2004 | Verdonk |
| 6,683,939 B1 | 1/2004 | Chiloyan et al. |
| 6,687,362 B1 | 2/2004 | Lindquist et al. |
| 6,690,672 B1 * | 2/2004 | Klein ........................... 370/401 |
| 6,693,897 B1 | 2/2004 | Huang |
| 6,697,461 B1 | 2/2004 | Middleswarth et al. |
| 6,697,796 B2 * | 2/2004 | Kermani ............................ 707/3 |
| 6,704,294 B1 | 3/2004 | Cruickshank |
| 6,711,158 B1 | 3/2004 | Kahane et al. |
| 6,717,938 B1 | 4/2004 | D'Angelo |
| 6,718,026 B1 | 4/2004 | Pershan et al. |
| 6,718,178 B1 | 4/2004 | Sladek et al. |
| 6,724,887 B1 | 4/2004 | Eibacher et al. |
| 6,731,238 B2 | 5/2004 | Johnson |
| 6,735,292 B1 | 5/2004 | Johnson |
| 6,738,458 B1 | 5/2004 | Cline et al. |
| 6,744,861 B1 | 6/2004 | Pershan et al. |
| 6,748,054 B1 | 6/2004 | Gross et al. |
| 6,757,365 B1 | 6/2004 | Bogard |
| 6,768,788 B1 | 7/2004 | Langseth et al. |
| 6,768,790 B1 | 7/2004 | Manduley et al. |
| 6,771,949 B1 | 8/2004 | Corliss |
| 6,775,267 B1 | 8/2004 | Kung et al. |
| 6,775,546 B1 | 8/2004 | Fuller |
| 6,788,772 B2 | 9/2004 | Barak et al. |
| 6,788,775 B1 | 9/2004 | Simpson |
| 6,792,092 B1 | 9/2004 | Michalewicz |
| 6,798,753 B1 * | 9/2004 | Doganata et al. ............. 370/260 |
| 6,801,610 B1 * | 10/2004 | Malik ...................... 379/202.01 |
| 6,807,258 B1 | 10/2004 | Malik |
| 6,807,259 B1 | 10/2004 | Patel et al. |
| 6,816,468 B1 | 11/2004 | Czuickshank |
| 6,816,469 B1 | 11/2004 | Kung et al. |
| 6,820,055 B2 | 11/2004 | Saindon et al. |
| 6,842,460 B1 | 1/2005 | Olkkonen et al. |
| 6,847,823 B1 | 1/2005 | Lehikoinen et al. |
| 6,853,634 B1 | 2/2005 | Davies et al. |
| 6,853,713 B1 | 2/2005 | Fobert et al. |
| 6,856,974 B1 | 2/2005 | Ganesan et al. |
| 6,876,632 B1 | 4/2005 | Takeda |
| 6,876,736 B2 | 4/2005 | Lamy et al. |
| 6,882,714 B2 | 4/2005 | Mansfield |
| 6,882,838 B1 | 4/2005 | Lee et al. |
| 6,885,742 B1 | 4/2005 | Smith |
| 6,907,111 B1 | 6/2005 | Zhang et al. |
| 6,917,610 B1 | 7/2005 | Kung et al. |
| 6,944,279 B2 | 9/2005 | Elsey et al. |
| 6,947,538 B2 | 9/2005 | Shen et al. |
| 6,954,521 B2 | 10/2005 | Bull et al. |
| 6,954,524 B2 | 10/2005 | Gibson |
| 6,956,942 B2 | 10/2005 | McKinzie et al. |
| 6,958,984 B2 | 10/2005 | Kotzin |
| 6,961,409 B2 | 11/2005 | Kato |
| 6,963,857 B1 | 11/2005 | Johnson |
| 6,970,705 B2 | 11/2005 | Yoshimoto et al. |
| 6,996,227 B2 | 2/2006 | Albal et al. |
| 6,996,370 B2 | 2/2006 | DeLoye et al. |
| 6,999,563 B1 | 2/2006 | Thorpe et al. |
| 7,024,209 B2 | 4/2006 | Gress et al. |
| 7,027,435 B2 | 4/2006 | Bardehle |
| 7,031,437 B1 | 4/2006 | Parsons et al. |
| 7,043,521 B2 | 5/2006 | Eitel |
| 7,065,198 B2 | 6/2006 | Brown et al. |
| 7,068,768 B2 | 6/2006 | Barnes |
| 7,076,528 B2 | 7/2006 | Premutico |
| 7,099,288 B1 | 8/2006 | Parker et al. |
| 7,107,312 B2 | 9/2006 | Hackbarth et al. |
| 7,116,972 B1 | 10/2006 | Zhang et al. |
| 7,127,050 B2 | 10/2006 | Walsh et al. |
| 7,130,390 B2 | 10/2006 | Abburi |
| 7,139,728 B2 | 11/2006 | Rigole |
| 7,139,782 B2 | 11/2006 | Osaki |
| 7,142,646 B2 | 11/2006 | Zafar et al. |
| 7,149,773 B2 | 12/2006 | Haller et al. |
| 7,155,001 B2 | 12/2006 | Tiliks et al. |
| 7,174,306 B1 | 2/2007 | Haseltine |
| 7,181,417 B1 | 2/2007 | Langseth et al. |
| 7,187,932 B1 | 3/2007 | Barchi |
| 7,190,773 B1 | 3/2007 | D'Silva et al. |
| 7,209,955 B1 | 4/2007 | Major et al. |
| 7,212,808 B2 | 5/2007 | Engstrom et al. |
| 7,245,929 B2 | 7/2007 | Henderson et al. |
| 7,254,220 B1 | 8/2007 | Reding et al. |
| 7,254,643 B1 | 8/2007 | Peters et al. |
| 7,283,808 B2 | 10/2007 | Castell et al. |
| 7,289,489 B1 | 10/2007 | Kung et al. |
| 7,308,087 B2 | 12/2007 | Joyce et al. |
| 7,315,614 B2 | 1/2008 | Bedingfield, Sr. et al. |
| 7,379,538 B1 | 5/2008 | Ali et al. |
| 7,418,090 B2 | 8/2008 | Reding et al. |
| 7,428,580 B2 | 9/2008 | Hullfish et al. |
| 7,546,337 B1 | 6/2009 | Crawford |
| 7,616,747 B2 | 11/2009 | Wurster et al. |
| 7,912,193 B2 | 3/2011 | Chingon et al. |
| 2001/0003202 A1 | 6/2001 | Mache et al. |
| 2001/0012286 A1 | 8/2001 | Huna et al. |
| 2001/0014863 A1 | 8/2001 | Williams, III |
| 2001/0017777 A1 | 8/2001 | Maruyama et al. |
| 2001/0025262 A1 | 9/2001 | Ahmed |
| 2001/0025280 A1 | 9/2001 | Mandato et al. |
| 2001/0032181 A1 | 10/2001 | Jakstadt et al. |
| 2001/0039191 A1 | 11/2001 | Maierhofer |
| 2001/0040954 A1 | 11/2001 | Brachman et al. |
| 2001/0043689 A1 | 11/2001 | Malik |
| 2001/0043690 A1 | 11/2001 | Bakshi et al. |
| 2001/0043691 A1 | 11/2001 | Bull et al. |
| 2001/0051534 A1 | 12/2001 | Amin |
| 2001/0054066 A1 | 12/2001 | Spitzer |
| 2001/0056466 A1 | 12/2001 | Thompson et al. |
| 2002/0012425 A1 | 1/2002 | Brisebois et al. |
| 2002/0018550 A1 | 2/2002 | Hafez |
| 2002/0022453 A1 | 2/2002 | Balog et al. |
| 2002/0026575 A1 | 2/2002 | Wheeler et al. |

| | | | |
|---|---|---|---|
| 2002/0035617 A1 | 3/2002 | Lynch et al. | |
| 2002/0040355 A1 | 4/2002 | Weiner | |
| 2002/0046299 A1 | 4/2002 | Lefeber et al. | |
| 2002/0055351 A1 | 5/2002 | Elsey et al. | |
| 2002/0057678 A1 | 5/2002 | Jiang et al. | |
| 2002/0062251 A1 | 5/2002 | Anandan et al. | |
| 2002/0064268 A1 | 5/2002 | Pelletier | |
| 2002/0069060 A1 | 6/2002 | Cannavo et al. | |
| 2002/0069096 A1 | 6/2002 | Lindoerfer et al. | |
| 2002/0071539 A1 | 6/2002 | Diament et al. | |
| 2002/0073163 A1 | 6/2002 | Churchill et al. | |
| 2002/0075303 A1 | 6/2002 | Thompson et al. | |
| 2002/0075306 A1 | 6/2002 | Thompson et al. | |
| 2002/0076022 A1 | 6/2002 | Bedingfield | |
| 2002/0076026 A1 | 6/2002 | Batten | |
| 2002/0076027 A1 | 6/2002 | Bernnan et al. | |
| 2002/0077082 A1 | 6/2002 | Cruickshank | |
| 2002/0078153 A1 | 6/2002 | Chung et al. | |
| 2002/0080942 A1 | 6/2002 | Clapper | 379/201.01 |
| 2002/0082028 A1 | 6/2002 | Wittenkamp | |
| 2002/0082030 A1 | 6/2002 | Berndt et al. | |
| 2002/0083462 A1 | 6/2002 | Arnott | 348/14.08 |
| 2002/0085515 A1 | 7/2002 | Jaynes et al. | |
| 2002/0085687 A1 | 7/2002 | Contractor et al. | |
| 2002/0085701 A1 | 7/2002 | Parsons et al. | |
| 2002/0100798 A1 | 8/2002 | Farrugia et al. | |
| 2002/0103864 A1 | 8/2002 | Rodman et al. | |
| 2002/0103898 A1 | 8/2002 | Moyer et al. | |
| 2002/0110121 A1 | 8/2002 | Mishra | 370/389 |
| 2002/0115471 A1 | 8/2002 | DeLoye et al. | |
| 2002/0122545 A1 | 9/2002 | Schwab et al. | |
| 2002/0126817 A1 | 9/2002 | Hariri et al. | |
| 2002/0128025 A1 | 9/2002 | Sin | |
| 2002/0128033 A1 | 9/2002 | Burgess | |
| 2002/0137507 A1 | 9/2002 | Winkler | |
| 2002/0137530 A1 | 9/2002 | Karve | |
| 2002/0138468 A1 | 9/2002 | Kermani | |
| 2002/0146105 A1 | 10/2002 | McIntyre | |
| 2002/0147777 A1 | 10/2002 | Hackbarth et al. | |
| 2002/0147811 A1 | 10/2002 | Schwartz et al. | 709/225 |
| 2002/0152165 A1 | 10/2002 | Dutta et al. | |
| 2002/0154210 A1 | 10/2002 | Ludwig et al. | |
| 2002/0168055 A1 | 11/2002 | Crockett et al. | |
| 2002/0177410 A1 | 11/2002 | Klein et al. | |
| 2002/0178117 A1 | 11/2002 | Maguire et al. | |
| 2003/0005150 A1 | 1/2003 | Thompson et al. | |
| 2003/0014488 A1 | 1/2003 | Dalal et al. | |
| 2003/0035381 A1* | 2/2003 | Chen et al. | 370/261 |
| 2003/0036380 A1 | 2/2003 | Skidmore | |
| 2003/0045309 A1 | 3/2003 | Knotts | |
| 2003/0046071 A1 | 3/2003 | Wyman et al. | |
| 2003/0053612 A1* | 3/2003 | Henrikson et al. | 379/202.01 |
| 2003/0055735 A1 | 3/2003 | Cameron et al. | |
| 2003/0055906 A1 | 3/2003 | Packham et al. | |
| 2003/0058838 A1 | 3/2003 | Wengrovitz | 370/352 |
| 2003/0063732 A1 | 4/2003 | Mcknight et al. | |
| 2003/0069874 A1 | 4/2003 | Hertzog et al. | |
| 2003/0083040 A1 | 5/2003 | Ruth et al. | |
| 2003/0092451 A1 | 5/2003 | Holloway et al. | |
| 2003/0093700 A1 | 5/2003 | Yoshimoto et al. | |
| 2003/0096626 A1 | 5/2003 | Sabo et al. | |
| 2003/0097635 A1 | 5/2003 | Giannetti | |
| 2003/0104827 A1 | 6/2003 | Moran et al. | |
| 2003/0108172 A1 | 6/2003 | Petty et al. | |
| 2003/0112928 A1 | 6/2003 | Brown et al. | |
| 2003/0112952 A1 | 6/2003 | Brown et al. | |
| 2003/0119532 A1 | 6/2003 | Hatch | |
| 2003/0140004 A1 | 7/2003 | O'Leary et al. | |
| 2003/0142798 A1 | 7/2003 | Gavette et al. | |
| 2003/0147518 A1 | 8/2003 | Albal et al. | |
| 2003/0149662 A1 | 8/2003 | Shore | |
| 2003/0158860 A1 | 8/2003 | Caughey | |
| 2003/0165223 A1 | 9/2003 | Timmins et al. | |
| 2003/0167229 A1 | 9/2003 | Ludwig et al. | |
| 2003/0169330 A1 | 9/2003 | Ben-Shachar et al. | |
| 2003/0179743 A1 | 9/2003 | Bosik et al. | |
| 2003/0179864 A1 | 9/2003 | Stillman et al. | |
| 2003/0187992 A1 | 10/2003 | Steenfeldt et al. | |
| 2003/0208541 A1 | 11/2003 | Musa | |
| 2003/0217097 A1 | 11/2003 | Eitel | |
| 2003/0228863 A1 | 12/2003 | Vander Veen et al. | |
| 2004/0002350 A1 | 1/2004 | Gopinath et al. | |
| 2004/0002902 A1 | 1/2004 | Muehlhaeuser | |
| 2004/0019638 A1 | 1/2004 | Makagon et al. | 709/204 |
| 2004/0034700 A1 | 2/2004 | Polcyn | |
| 2004/0037409 A1 | 2/2004 | Crockett et al. | |
| 2004/0044658 A1 | 3/2004 | Crabtree et al. | |
| 2004/0052356 A1 | 3/2004 | McKinzie et al. | |
| 2004/0081292 A1 | 4/2004 | Brown et al. | |
| 2004/0103152 A1 | 5/2004 | Ludwig et al. | |
| 2004/0119814 A1 | 6/2004 | Clisham et al. | |
| 2004/0127256 A1 | 7/2004 | Goldthwaite et al. | |
| 2004/0156491 A1 | 8/2004 | Reding et al. | |
| 2004/0184593 A1 | 9/2004 | Elsey et al. | |
| 2004/0203942 A1 | 10/2004 | Dehlin | |
| 2004/0208305 A1 | 10/2004 | Gross et al. | |
| 2004/0236792 A1 | 11/2004 | Celik | |
| 2004/0247088 A1 | 12/2004 | Lee | |
| 2004/0249884 A1 | 12/2004 | Caspi et al. | |
| 2004/0264654 A1 | 12/2004 | Reding et al. | |
| 2005/0053206 A1 | 3/2005 | Chingon et al. | |
| 2005/0053221 A1 | 3/2005 | Reding et al. | |
| 2005/0102382 A1 | 5/2005 | MacGregor et al. | |
| 2005/0117714 A1 | 6/2005 | Chingon et al. | |
| 2005/0129208 A1 | 6/2005 | McGrath et al. | |
| 2005/0149487 A1 | 7/2005 | Celik | |
| 2005/0191994 A1 | 9/2005 | May et al. | |
| 2005/0216421 A1 | 9/2005 | Barry et al. | |
| 2005/0220286 A1 | 10/2005 | Valdez et al. | |
| 2005/0243993 A1 | 11/2005 | McKinzie et al. | |
| 2006/0093120 A1 | 5/2006 | Thorpe et al. | |
| 2006/0095575 A1 | 5/2006 | Sureka et al. | |
| 2006/0168140 A1 | 7/2006 | Inoue et al. | |
| 2006/0276179 A1 | 12/2006 | Ghaffari et al. | |
| 2006/0277213 A1 | 12/2006 | Robertson et al. | |
| 2007/0021111 A1 | 1/2007 | Celik | |
| 2009/0060155 A1 | 3/2009 | Chingon et al. | |

FOREIGN PATENT DOCUMENTS

| | | |
|---|---|---|
| EP | 0818908 A3 | 1/1998 |
| EP | 1014630 | 6/2000 |
| EP | 1028578 | 8/2000 |
| EP | 1161063 | 12/2001 |
| EP | 1193617 | 4/2002 |
| EP | 1235387 | 8/2002 |
| EP | 1294201 | 3/2003 |
| JP | 59-169264 | 9/1984 |
| JP | 02-260750 | 10/1990 |
| JP | 4-336742 | 11/1992 |
| JP | 05-316233 | 11/1993 |
| JP | 6-113020 | 4/1994 |
| JP | 07-030664 | 1/1995 |
| JP | 7-058856 | 3/1995 |
| JP | 07-107171 | 4/1995 |
| JP | 7-107549 | 4/1995 |
| JP | 07-123098 | 5/1995 |
| JP | 08-149226 | 7/1996 |
| JP | 08-181763 | 7/1996 |
| JP | 08-298546 | 11/1996 |
| JP | 08-331642 | 12/1996 |
| JP | 9-064869 | 3/1997 |
| JP | 9-064977 | 3/1997 |
| JP | 09-083651 | 3/1997 |
| JP | 9-200350 | 7/1997 |
| JP | 9-223087 | 8/1997 |
| JP | 9-261759 | 10/1997 |
| JP | 09-294158 | 11/1997 |
| JP | 09-294163 | 11/1997 |
| JP | 10-013546 | 1/1998 |
| JP | 10-051555 | 2/1998 |
| JP | 10-155038 | 6/1998 |
| JP | 10-173769 | 6/1998 |
| JP | 10-336319 | 12/1998 |
| JP | 11-055407 | 2/1999 |
| JP | 11-127222 | 5/1999 |
| JP | 11-136316 | 5/1999 |
| JP | 11-187156 | 7/1999 |
| JP | 11-191800 | 7/1999 |

| | | |
|---|---|---|
| JP | 11-266309 | 9/1999 |
| JP | 2000-032116 | 1/2000 |
| JP | 2000-134309 | 5/2000 |
| JP | 2000-165433 | 6/2000 |
| JP | 2000-196756 | 7/2000 |
| JP | 2000224301 | 8/2000 |
| JP | 2000-270307 | 9/2000 |
| JP | 2000-349902 | 12/2000 |
| JP | 2001-144859 | 5/2001 |
| JP | 2001-156921 | 6/2001 |
| JP | 2001-197210 | 7/2001 |
| JP | 2001-197562 | 7/2001 |
| JP | 2001-243231 | 9/2001 |
| JP | 2001-298545 | 10/2001 |
| JP | 2002-016673 | 1/2002 |
| JP | 2002-41522 | 2/2002 |
| JP | 2002-044123 | 2/2002 |
| JP | 2002-044257 | 2/2002 |
| JP | 2002047807 | 2/2002 |
| JP | 2002-094696 | 3/2002 |
| JP | 2002-232575 | 8/2002 |
| JP | 2002-237893 | 8/2002 |
| JP | 2002-247148 | 8/2002 |
| JP | 2002-261834 | 9/2002 |
| JP | 2002-300290 | 10/2002 |
| JP | 2002-300306 | 10/2002 |
| WO | WO-97/12948 | 5/1995 |
| WO | WO 96/14704 | 5/1996 |
| WO | WO-97/20423 | 6/1997 |
| WO | WO-97/33421 | 9/1997 |
| WO | WO-98/02007 | 1/1998 |
| WO | 99/38309 | 7/1999 |
| WO | WO 00/45557 | 8/2000 |
| WO | 0064133 | 10/2000 |
| WO | WO-00/60837 | 10/2000 |
| WO | WO 01/11586 A1 | 2/2001 |
| WO | WO-01/22751 | 3/2001 |
| WO | WO 01/35621 | 5/2001 |
| WO | 0152513 | 7/2001 |
| WO | WO 01/89212 | 11/2001 |
| WO | WO-02/25907 | 3/2002 |
| WO | 02/43338 | 5/2002 |

OTHER PUBLICATIONS

Kornowski, J., "Wildfire at Your Back and Call-A Voice-Activated Telephone Assistant That Minds You and Your Messages", http://www.lacba.org/lalawyer/techwildfire.html, pronted Oct. 1, 2004.
Cisco Personal Assistant 1.4, Cisco Systems. Jun. 24, 2003, http://www.cisco.com/en/US/products/sw/voicesw/ps2026/prod_presentation_list.html, printed Oct. 1, 2004.
"MP3 Recorder Download—MP3 Recorder—Record Audio Stream to MP3 or WAV," 2002, http://www.mp3-recorder.net.
"FAQ Premium Home Answer" eVoice, http://content.evoice.com/wcs/signUp/FAQ_premHA_s01.htm.
"Audio Digitizing Process," TalkBank, http://www.talkbank.org/da/audiodig.html.
"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.
"Macromedia SoundEdit 16 Support Center-Working with Other Programs, What is Shockwave Audio Streaming?" http://www.macromedia.com/support/soundedit/how/shock/whatis.html.
"How Internet Radio Works," Howstuffworks, http://computer.howstuffworks.com/internet-radio.htm/printable.
"Real-Time Collaboration Integration in the Portal," T. Odenwald, SAP Design Guild, http://www.sapdesignguild.org/editions/edition5/synch_collab.asp.
"NetMeeting101," http://www.meetingbywire.com/NetMeeting101.htm.
"NetMeeting102," http://www.meetingbywire.com/NetMeeting102.htm.
"Instructions on Application Sharing and Data Collaboration," VCON Escort and Cruiser, http://www.vide.gatech.edu/docs/share/.
"Instructions on Multipoint Application Sharing and Data Collaboration," VCON Escort and Cruiser with the RadVision MCU, http://www.vide.gatech.edu/docs/multi-share/.
Business Solutions/Professional, http://www.accessline.com/business_sol/bs_professional_body.html.
"A Model for Presence and Instant Messaging," M. Day et al., Fujitsu, Feb. 2000, Network Working Group, Request for Comments 2778.
Data Connection, Strategic Computer Technology, MeetingServer, "Broadband for Learning Case Study," Data Connection Ltd, 1998-2004, http://www.dataconnection.com/conferencing/meetingserver_casestudy.htm.
Data Connection, MailNGen, "Next Generation Messaging for Service Providers," Data Connection Limited, 2003-4.
Data Connection, Strategic Computer Technology, "Directories Explained," Data Connection Ltd, 1998-2004, http://www.dataconnection.com/inetapps/direxpl.htm.
Data Connection, Strategic Computer Technology, Directory Systems, "Directories and Meta-Directories," Data Connection Ltd, 1998-2004, http://www.dataconnection.com/inetapps/directory.htm.
Data Connection, Strategic Computer Technology, "DC-IMS\Voice Unified Messaging Gateway," Data Connection Ltd, 1998-2000, http://web.archive.org/web/20010307174512/www.dataconnection.com/messging/spivoice.htm.
Data Connection, Strategic Software Technology, "DC-SurroundSuite for Service Providers," Data Connection Ltd, 1998-2000, http://web.archive.org/web/20000914200355/www.dataconnection.com/messging/spssuite.htm.
Data Connection, Strategic Computer Technology, "Messaging Software Products and Services," Data Connection Ltd, 1998-2000, http://web.archive.org/web/20000819063320/www.dataconnection.com/messging/messgidx.htm.
Data Connection, Strategic Software Technology, "DC-Share for UNIX," Data Connection Ltd, 1998-2000, http://web.archive.org/web/200009142007131/www.dataconnection.com/conf/DCshare.htm.
Data Connection, Strategic Software Technology, "DC-H.323," Data Connection Ltd, 1998-2000, http://web.archive.org/web/20001120050600/www.dataconnection.com/conf/h323.htm.
Data Connection, Strategic Software Technology, "DC-WebShare," Data Connection Ltd, 1998-2000, http://web.archive.org/web/20001016115016/www.dataconnection.com/conf/webshare.htm.
Data Connection, Strategic Computer Technology, "DC-Recorder," Data Connection Ltd, 1998-2000, http://web.archive.org/web/20001016055611/www.dataconnection.com/conf/recorder.htm.
Data Connection, Strategic Software Technology, "DC-MeetingServer," Data Connection Ltd, 1998-2000, http://web.archive.org/web/20000914200719/www.dataconnection.com/conf/meetingserver.htm.
Data Connection, Strategic Computer Technology, "DC-MeetingServer," Data Connection Ltd, 1998-2000, http://web.archive.org/web/20021201144529/www.dataconnection.com/inetapps.conferencing.htm.
Data Connection, Strategic Software Technology, "DC-VoiceNet Features," Data Connection Ltd, 1998-2000, http://web.archive.org/web/20001016102614/www.dataconnection.com/messging/vnfeat.htm.
Data Connection, Strategic Software Technology, "DC-VoiceNet," Data Connection Ltd, 1998-2000, http://web.archive.org/web/20000914200424/www.dataconnection.com/messging/vnet.htm.
Data Connection, Strategic Computer Technology, "Messaging Software Products and Services," Data Connection Ltd, 1998-2000, http://web.archive.org/web/20010305143803/www.dataconnection.com/messging/messgidx.htm.
Data Connection, Strategic Computer Technology, "DC-SurroundSuite for Enterprises," Data Connection Ltd, 1998-2000, http://web.archive.org/web/20010306082711/www.dataconnection.com/messging/enssuite.htm.
Data Connection, "SmartDialer Functional Overview," Version v1.0, Internet Applications Group, Data Connection Ltd., Nov. 3, 2003.
Data Connection, "SIP Market Overview, An analysis of SIP technology and the state of the SIP Market," Jonathan Cumming, Data Connection Ltd., 2003-2004.

Data Connection, "Integrating Voicemail Systems, A white paper describing the integration of heterogeneous voicemail systems," Michael James, Internet Applications Group, Data Connection Ltd., 2004.

Data Connection, Strategic Computer Technology, "MailNGen: Next generation messaging for Service Providers," Data Connection Ltd, 1998-2004, http://www.dataconnection.com/messaging/.

Data Connection, Strategic Computer Technology, "MailNGen: Unified Messaging," Data Connection Ltd, 1998-2004, http://www.dataconnection.com/messaging/unified_messaging.htm.

Data Connection, Strategic Computer Technology, "MeetingServer: The award-winning web conferencing solution for Service Providers," Data Connection Ltd, 1998-2005, http://www.dataconnection.com/conferencing/.

Data Connection, Strategic Computer Technology, "MeetingServer: The web conferencing solution for Service Providers," Data Connection Ltd, 1998-2004, http://www.dataconnection.com/conferencing/meetingserver.htm.

Data Connection, Strategic Computer Technology, "MeetingServer: Web conferencing architecture," Data Connection Ltd, 1998-2004, http://www.dataconnection.com/conferencing/meetingserver_arch.htm.

"MP3 Recorder Download—MP3 Recorder—Record Audio Stream to MP3 or WAV, " 2002 http://www.mp3-recorder.net.

"Voice-ASP, White Paper: Market Opportunities for Enchanced Voicemail," eVoice, Nov. 10, 2000.

"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.

"Macromedia SoundEdit 16 Support Center-Working with Other Programs, What is Shockwave Audtio Streaming?" http://www.macromedia.com/support/soundedit/how/shock/whatis.html.

"Chapter3: Overview," last updated Dec. 2, 1999, http://service.real.com/help/library/guides/g270/htmfiles/overview.htm.

"Calendar Scheduling Teleconference Communication Mechanism," IBM Technical Disclosure Bulletin, IBM Corp. New York, US, vol. 37, No. 3, Mar. 1, 1994, p. 561.

White, "How Computers Work," Millenium Edition, Sep. 1999, Que Corporation, pp. vi-xi, 135-184, 399-421.

Derfler et al., "How Networks Work," Bestseller Edition, 1996, Ziff-Davis Press, pp. vi-ix, 1-3, 21-70, 190-198.

Gralla, "How the Internet Works," Ziff-Davis Press, 1999, pp. vi-xi, 2-3, 8-11, 308-324.

Muller, "Desktop Encyclopedia of the Internet," Artech House Inc., 1999, pp. v-xiv, 233-246, 539-559.

http://replay.waybackmachine.org/20020207142936/http://www.clicktocall.com/main.htm, Internet archive of website "www.clicktocall.com", dated Feb. 7, 2002.

Gaedke, et al., "Web Content Delivery to Heterogeneous Mobile Platforms", http://citeseer.ist.psu.edu/viewdoc/summary?doi=10 .1.1.33.4361, 1998, 1-14.

Gessler, et al., "PDAs as mobile WWW browers", http://citeseer.ist.psu.edu/viewdoc/summary?doi=1 0.1.1.48.9198, 1995, 1-12.

Kunz, et al., "An Architecture for Adaptive Mobile Applications", http://citeseer.ist.psu.edu/viewdoc/summary?doi=1 0.1.1.40.624, 1999, 1-15.

Lauff, et al., "Multimedia Client Implementation on Personal Digital Assistants", http://citeseer.ist.psu.edu/viewdoc/summary?doi=1 0.1.1.6.6059, 1997, 1-15.

U.S. Appl. No. 09/828,679, filed Apr. 6, 2001, Reding et al.

U.S. Appl. No. 09/785,223, filed Feb. 16, 2001, Swingle et al.

"MP3 Recorder Download—MP3 Recorder—Record Audio Stream to MP3 or WAV," 2002 http://www.mp3-recorder.net.

"FAQ Premium Home Answer" eVoice, http://content.evoice.com/wcs/signUp/FAQ_premHA_s01.htm, Nov. 24, 2003.

"Voice-ASP, White Paper Technology & Processes," eVoice, Dec. 13, 2000.

"Voice-ASP, White Paper: Market Opportunities for Enhanced Voicemail," eVoice, Nov. 10, 2000.

"Audio Digitizing Process," TalkBank, http://www.talkbank.org/da/audiodig.html, Nov. 24, 2003.

"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.

"Macromedia SoundEdit 16 Support Center—Working with Other Programs, What is Shockwave Audio Streaming?" http://www.macromedia.com/support/soundedit/how/shock/whatis.html, Nov. 24, 2003.

"Chapter 3: Overview," last updated Dec. 2, 1999, http://service.real.com/help/library/guides/g270/htmfiles/overview.htm.

"How Internet Radio Works," Howstuffworks, http://computer.howstuffworks.com/internet-radio.htm/printable, Nov. 24, 2003.

"Telecommunications and Personal Management Services Linked in Collaboration by Verizon and Microsoft," Oct. 23, 2001, http://www.microsoft.com/presspass/press/2001/oct01/10-23MSVerizonPr.asp.

"Real-Time Collaboration Integration in the Portal," T. Odenwalk, SAP Design Guild, http://www.sapdesignguild.org/editions/edition5/synch_collab.asp, Nov. 24, 2003.

"NetMeeting101," http://www.meetingbywire.com/NetMeeting101.htm, Nov. 24, 2003.

"NetMeeting102," http://www.meetingbywire.com/NetMeeting102.htm, Nov. 24, 2003.

"Instructions on Application Sharing and Data Collaboration," VCON Escort and Cruiser, http://www.vide.gatech.edu/docs/share/, Nov. 24, 2003.

"Instructions on Multipoint Application Sharing and Data Collaboration," VCON Escort and Cruiser with the RadVision MCU, http://www.vide.gatech.edu/docs/multi-share/, Nov. 24, 2003.

"File Transfer," Microsoft Windows Technologies Windows NetMeeting, last updated Jun. 4, 1999, http://www.microsoft.com/windows/netmeeting/features/files/default.asp.

"From Dial Tone to Media Tone," Analyst: R. Mahowald, IDC, Jun. 2002.

"MediaTone—The 'Dial Tone' for Web Communications Services," Webex, 2003.

Business Solutions/Professional, http://www.accessline.com/business_sol/bs_professional_body.html, Nov. 24, 2003.

"Accessline Comms' Accessline Service, The One-Number Wonder," *CommWeb*, T. Kramer, Feb. 1, 2000, http://www.cconvergence.com/Article/TCM20000504S0014.

"InteleScreener," 2003, http://www.intelescreener.com/howitworks.html.

"TeleZapper from Privacy Technologies," Privacy Corps—Our Review, 2002, http://www.privacycorps.com/pages/product1.htm.

"A Proposal for Internet Call Waiting Service Using SIP," A. Brusilovsky et al., Lucent Technologies, PINT Working Group, Internet Draft, Jan. 1999.

"A Model for Presence and Instant Messaging", M. Day, et al. Fujitsu, Feb. 2000, Network Working Group, Request for Comments 2778.

* cited by examiner

METHODS AND SYSTEMS FOR CONFIGURING AND PROVIDING CONFERENCE CALLS

RELATED APPLICATIONS

This application is a continuation-in-part of U.S. patent application Ser. No. 10/083,793, entitled "METHOD AND APPARATUS FOR CALENDARED COMMUNICATIONS FLOW CONTROL," filed Feb. 27, 2002; U.S. patent application Ser. No. 10/083,792, entitled "VOICE MAIL INTEGRATION WITH INSTANT MESSENGER," filed Feb. 27, 2002 now U.S. Pat. No. 7,142,646; U.S. patent application Ser. No. 10/083,884, entitled "DEVICE INDEPENDENT CALLER ID," filed Feb. 27, 2002 now U.S. Pat. No. 7,190,773; U.S. patent application Ser. No. 10/083,822, entitled "METHOD AND APPARATUS FOR A UNIFIED COMMUNICATION MANAGEMENT VIA INSTANT MESSAGING," filed Feb. 27, 2002; and U.S. patent application Ser. No. 10/084,121, entitled "CALENDAR-BASED CALLING AGENTS," filed Feb. 27, 2002 now abandoned, all of which claim priority to U.S. Provisional Patent Application Nos. 60/272,122 Feb. 27, 2007, 60/272,167 Feb. 27, 2007, 60/275,667 Mar. 13, 2007, 60/275,719 Mar. 13, 2007, 60/275,020 Mar. 13, 2007, 60/275,031 Mar. 13, 2007, and 60/276,505 Mar. 19, 2007, and all of which are expressly incorporated herein by reference in their entirety.

Applicants also claim the right to priority under 35 U.S.C. §119(e) based on Provisional Patent Application No. 60/428,704, entitled "DIGITAL COMPANION," filed Nov. 25, 2002; and Provisional Patent Application No. 60/436,018, entitled "DIGITAL COMPANION," filed Dec. 26, 2002, both of which are expressly incorporated herein by reference in their entirety.

The present application also relates to U.S. patent application Ser. No. 10/720,859, entitled "METHODS AND SYSTEMS FOR CONFERENCE CALL BUFFERING"; U.S. patent application Ser. No. 10/721,009, entitled "METHODS AND SYSTEMS FOR COMPUTER ENHANCED CONFERENCE CALLING"; U.S. patent application Ser. No. 10/720,943, entitled "METHODS AND SYSTEMS FOR REMOTE CALL ESTABLISHMENT"; U.S. patent application Ser. No. 10/721,005, entitled "METHODS AND SYSTEMS FOR CALL MANAGEMENT WITH USER INTERVENTION"; U.S. patent application Ser. No. 10/720,868, entitled "METHODS AND SYSTEMS FOR DIRECTORY INFORMATION LOOKUP"; U.S. patent application Ser. No. 10/720,970, entitled "METHODS AND SYSTEMS FOR AUTOMATIC COMMUNICATION LINE MANAGEMENT BASED ON DEVICE LOCATION"; U.S. patent application Ser. No. 10/720,952, entitled "METHODS AND SYSTEMS FOR ADAPTIVE MESSAGE AND CALL NOTIFICATION"; U.S. patent application Ser. No. 10/720,870, entitled "METHODS AND SYSTEMS FOR A CALL LOG"; U.S. patent application Ser. No. 10/720,633, entitled "METHODS AND SYSTEMS FOR AUTOMATIC FORWARDING OF CALLS TO A PREFERRED DEVICE"; U.S. patent application Ser. No. 10/720,971, entitled "METHODS AND SYSTEMS FOR LINE MANAGEMENT"; U.S. patent application Ser. No. 10/720,784, entitled "METHODS AND SYSTEMS FOR CONTACT MANAGEMENT"; U.S. patent application Ser. No. 10/720,920, entitled "METHODS AND SYSTEMS FOR NOTIFICATION OF CALL TO PHONE DEVICE"; U.S. patent application Ser. No. 10/720,825, entitled "METHODS AND SYSTEMS FOR SINGLE NUMBER TEXT MESSAGING"; U.S. patent application Ser. No. 10/720,944, entitled "METHODS AND SYSTEMS FOR MULTI-USER SELECTIVE NOTIFICATION"; U.S. patent application Ser. No. 10/720,933, entitled "METHODS AND SYSTEMS FOR CPN TRIGGERED COLLABORATION"; and U.S. patent application Ser. No. 10/720,938, entitled "METHODS AND SYSTEMS FOR PREEMPTIVE REJECTION OF CALLS", all of which are expressly incorporated herein by reference in their entirety.

TECHNICAL FIELD

The present invention relates generally to data processing systems and, more particularly, to a method and system for providing conference call services.

BACKGROUND

A wide variety of means exist for communication between users. For example, a user may conduct phone calls via a home phone, work phone, and mobile phone. Users may also communicate using devices such as Personal Computers ("PC's"), Personal Digital Assistants ("PDA's"), pagers, etc. using different types of messaging services, such as e-mail and instant messaging.

The types of communications between users also vary. Users may communicate between each other individually or a group of users (e.g., three or more users) may communicate simultaneously through a conference call. There are different mechanisms for configuring a conference call between a group of users. Some conventional telecommunication systems configure a conference call by adding users to an established call one at a time. Alternatively, conventional systems configure a conference call by allowing members of a conference call group to call in to a common location (e.g., a bridge). Other conventional systems, on the other hand, allow a user to instruct a network to contact users included on a predetermined list to establish a conference call between the users.

Although current mechanisms enable users to configure and establish conference calls, they each require at least one user to initiate the configuration of the call at the time the conference call is to take place. Accordingly, there is a need for a system and method for automatically establishing a conference call between participant users.

SUMMARY OF THE INVENTION

Methods and systems consistent with certain aspects related to the invention automatically establish a conference call between a group of users. In one aspect of the invention, methods and systems detect a conference call event that was previously configured by a subscriber user and identify participant users associated with the conference call event. Once identified, participant users are contacted and responses are received from the users. Based on the received responses, a conference call is established between the participant users and the subscriber user. In one aspect of the invention, at least one of the detecting and identifying steps are performed without user intervention.

Other methods and systems consistent with certain aspect of the invention detect a conference call event previously configured by the subscriber user that indicates that a conference call should be established between a subscriber user and participant users. These methods and system also collect contact information for the participant users and provide a message including the contact information to a conference server that is configured to instruct a bridge to establish a conference call between the users by calling the participant users using the contact information included in the message. Further, these methods and systems receive a response message from the conference server including information associated with the conference call and at least one participant user.

In another aspect related to the invention, methods and systems consistent with certain principles of the invention facilitate the scheduling of a conference call for a predetermined date using a calendar application, whereby the scheduling includes identifying participant users that are to participate in the conference call. Further, these methods and systems, on the predetermined date, receive an indication that a conference call has been configured in accordance with the scheduled conference call. Also, these methods and systems receive an indication that at least one participant user has either joined or declined to join the conference call and, during the conference call, receive an indication that another participant user has ended communications with the conference call when that participant user terminates a connection with a bridge that established the conference call in accordance with instructions provided by a server that executes the calendar application.

Also, methods and systems consistent with certain aspects of the invention provide a first server for detecting a conference call event previously configured by a subscriber user and generating a first message based on the event, wherein the first message includes telephone numbers for a plurality of participant users identified by the subscriber user. These methods and systems also provide a second server for receiving the first message from the first server and generating a second message based on the first message, wherein the second message includes instructions for configuring a conference call and the telephone numbers. Additionally, the methods and systems provide a conference bridge for receiving the second message, extracting the telephone numbers from the second message, and calling the participant users using the telephone numbers, and establishing a conference call between the participant users and the subscriber user.

BRIEF DESCRIPTION OF THE DRAWINGS

The accompanying drawings, which are incorporated in and constitute a part of this specification, illustrate one embodiment of the invention and, together with the description, serve to explain the principles of the invention.

DETAILED DESCRIPTION

Reference will now be made in detail to exemplary embodiments of the present invention, examples of which are illustrated in the accompanying drawings. Wherever possible, the same reference numbers will be used throughout the drawings to refer to the same or like parts. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Overview

Methods and systems consistent with certain aspects of the present invention automatically set up and maintain conference calls between an initiating user and participant users. The initiating user may schedule a conference call event with a service center by identifying a time and date of a future conference call and any participant users that are to be included in the call. The service center scans a data structure associated with a calendar of events for the conference call event, and when the event is detected, the service center provides instructions to a conference bridge that initiates a call to each participant user identified by the initiating user. Each participant user may accept or reject the call through one or more feedback options made available by the conference bridge. Once a call is accepted by a participant user, the conference bridge facilitates the conference call between the initiating user and any participant users that have accepted the call. The conference bridge may also leverage a speech recognition server to create a transcript of any communications during the conference call that is provided to the initiating user following termination of the conference call.

Network Environment

Figure 1:
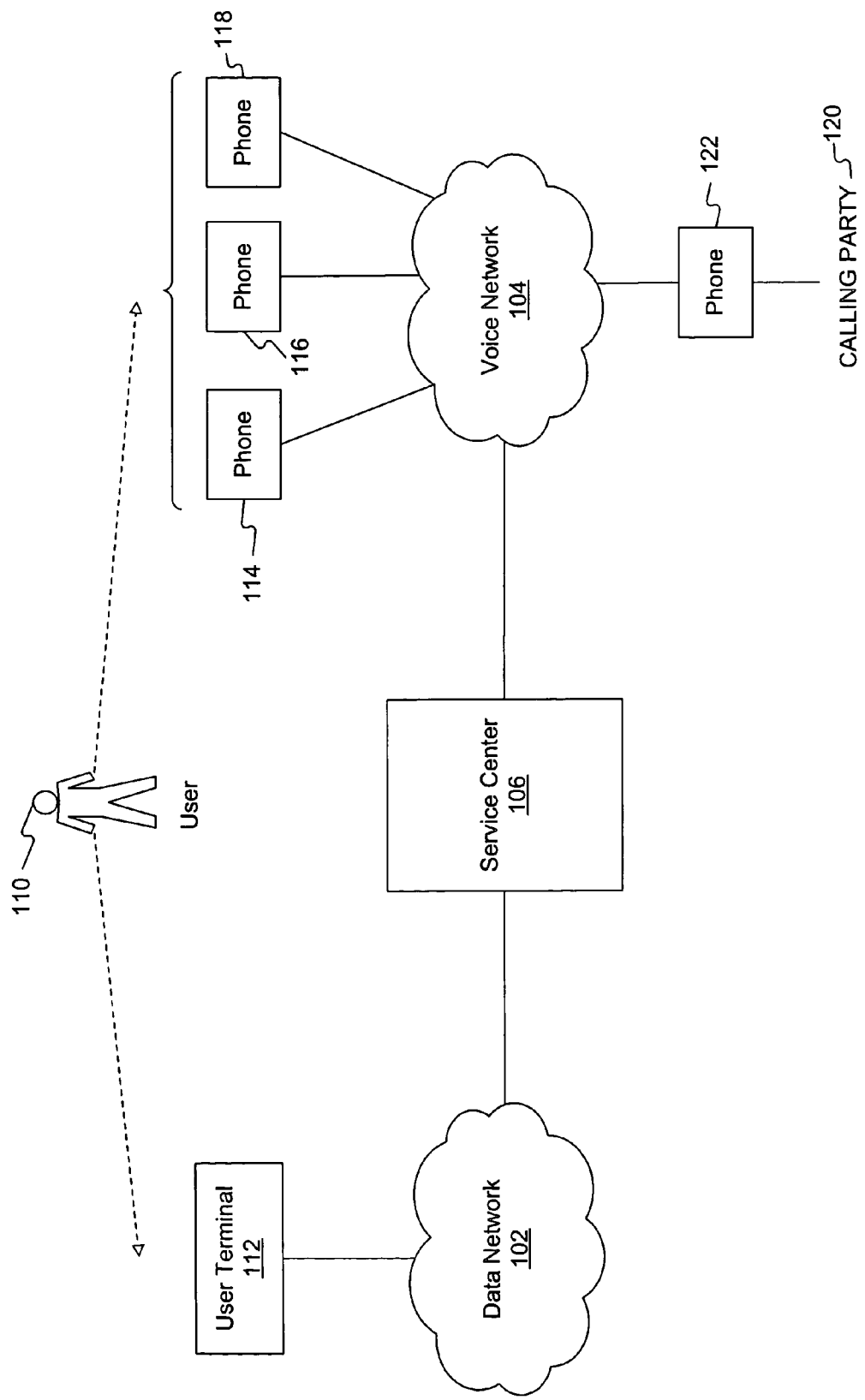
FIG. 1 is a diagram of an exemplary data processing and telecommunications environment in which features and aspects consistent with the principals of the present invention may be implemented.

FIG. 1 is a block diagram of a data processing and telecommunications environment 100, in which features and aspects consistent with the present invention may be implemented. The number of components in environment 100 is not limited to what is shown and other variations in the number of arrangements of components are possible, consistent with embodiments of the invention. The components of FIG. 1 may be implemented through hardware, software, and/or firmware. Data processing and telecommunications environment 100 may include a data network 102, a voice network 104, and a service center 106. A user 110 may use a user terminal 112 to interface with data network 102 and may use phones 114, 116, and 118 to interface with voice network 104. Calling party 120 may use phone 122 to call a user, such as user 110, at any one of phones 114, 116, and 118.

Data network 102 provides communications between the various entities depicted in environment 100 of FIG. 1, such as user terminal 112 and service center 106. Data network 102 may be a shared, public, or private network and encompass a wide area or local area. Data network 102 may be implemented through any suitable combination of wired and/or wireless communication networks. By way of example, data network 102 may be implemented through a Wide Area Network ("WAN"), Local Area Network ("LAN"), an intranet and/or the Internet. Further, the service center 106 may be connected to multiple data networks 102, such as, for example, to a wireless carrier network and to the Internet.

Voice network 104 may provide telephony services to allow a calling party, such as calling party 120, to place a telephone call to user 110. In one embodiment, voice network 104 may be implemented using a network, such as the Public Switched Telephone Network ("PSTN"). Alternatively, voice network 104 may be implemented on a voice over broadband network, such as a network using voice-over Internet Protocol ("VoIP") technology. Additionally, in other embodiments, the voice network may be a video over broadband network, such as, for example, a network for providing 2-way video communications. In another example, the voice network may be a wireless broadband network, such as, for example, a network using WiFi (i.e., IEEE 802.11(b) and/or (g)). In yet another example, voice network 104 may be a wireless voice network(s), such as, for example, a cellular or third-generation cellular network). In addition, voice network 104 may be implemented using any single or combination of the above-described technologies consistent with the principles of the present invention. Further, service center 106 may be connected to multiple voice networks 104, such as for example, Verizon's™ Voice Network, voice networks operated by other carriers, and wireless carrier networks.

Service center 106 provides a platform for managing communications over data network 102 and voice network 104. Service center 106 also provides gateway functions, such as code and protocol conversions, to transfer communications between data network 102 and voice network 104. Service center 106 may be implemented using a combination of hardware, software, and/or firmware. For example, service center 106 may be implemented using a plurality of general purpose computers or servers coupled by a network (not shown). Although service center 106 is shown with direct connections to data network 102 and voice network 104, any number and type of network elements may be interposed between service center 106, data network 102, and voice network 104.

User terminal 112 provides user 110 an interface to data network 102. For example, user terminal 112 may be implemented using any device capable of accessing the Internet, such as a general purpose computer or personal computer equipped with a modem. User terminal 112 may also be implemented in other devices, such as the Blackberry™, and Ergo Audrey™. Furthermore, user terminal 112 may be implemented in wireless devices, such as pagers, mobile phones (with data access functions), and Personal Digital Assistants ("PDAs") with network connections.

User terminal 112 also allows user 110 to communicate with service center 106. For example, user 110 may use Instant Messaging ("IM") to communicate with service center 106. In addition, user terminal 112 may use other aspects of TCP/IP including the Hypertext Transfer Protocol ("HTTP"); the User Datagram Protocol ("UDP"); the File Transfer Protocol ("FTP"); the Hypertext Markup Language ("HTML"); and the extensible Markup Language ("XML").

Furthermore, user terminal 112 may communicate directly with service center 106. For example, a client application may be installed on user terminal 112, which directly communicates with service center 106. Also, user terminal 112 may communicate with service center 106 via a proxy.

Phones 114, 116, 118, and 122 interface with voice network 104. Phones 114, 116, 118, and 122 may be implemented using known devices, including wireline phones and mobile phones. Although phones 114, 116, 118, and 122 are shown directly connected to voice network 104, any number of intervening elements, such as a Private Branch Exchange ("PBX"), may be interposed between phones 114, 116, 118, and 122 and voice network 104.

Figure 2:
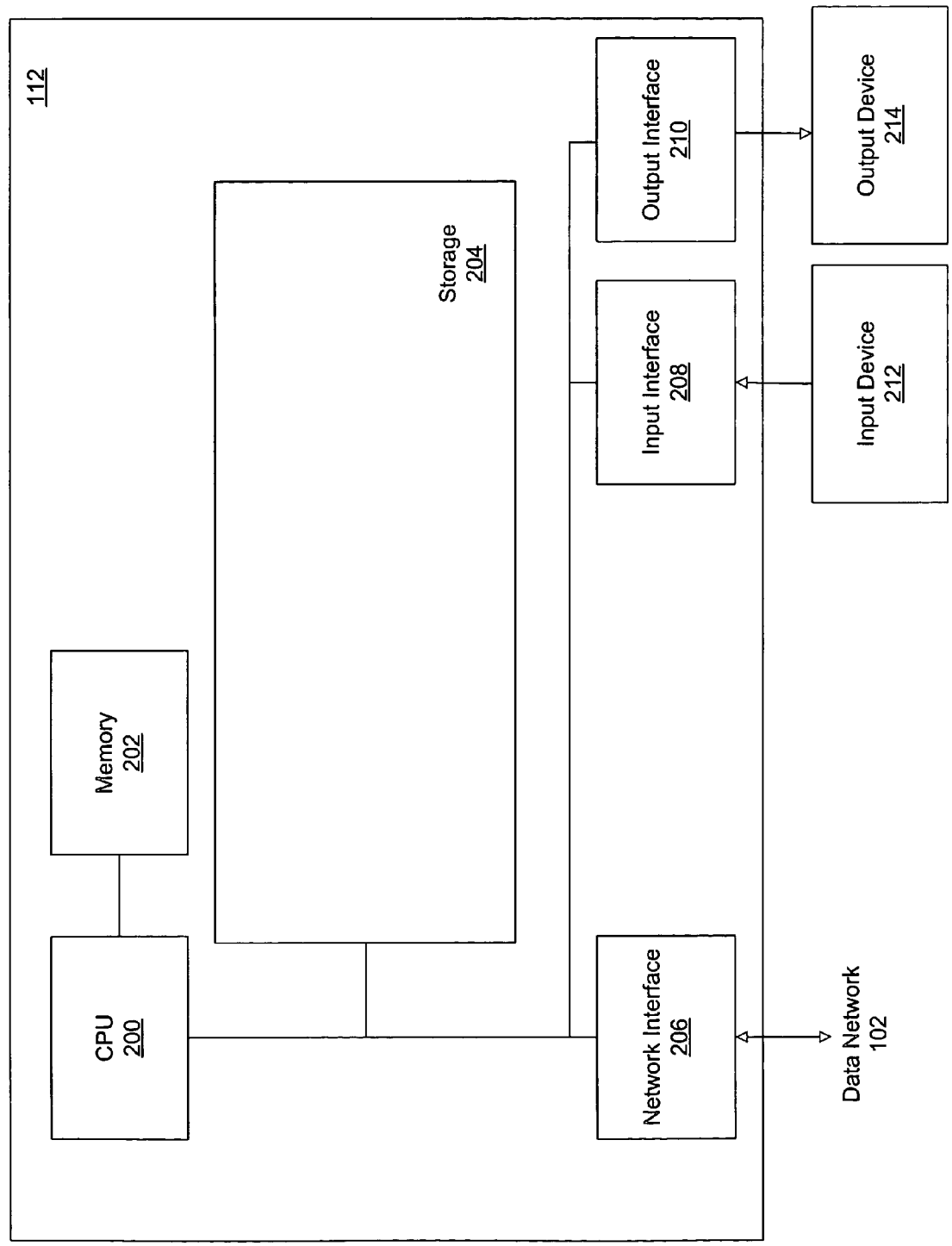
FIG. 2 is a diagram of an exemplary user terminal, consistent with the principals of the present invention.

FIG. 2 is a block diagram of a user terminal consistent with the present invention. User terminal 112 may include a Central Processing Unit ("CPU") 200, a memory 202, a storage module 204, a network interface 206, an input interface 208, an output interface 210, an input device 216, and an output device 218.

CPU 200 provides control and processing functions for user terminal 112. Although FIG. 2 illustrates a single CPU, user terminal 112 may include multiple CPUs. CPU 200 may also include, for example, one or more of the following: a co-processor, memory, registers, and other processing devices and systems as appropriate. CPU 200 may be implemented, for example, using a Pentium™ processor provided from Intel Corporation™.

Memory 202 provides a primary memory for CPU 200, such as for program code. Memory 202 may be embodied with a variety of components of subsystems, including a Random Access Memory ("RAM") and a Read-Only Memory ("ROM"). When user terminal 112 executes an application installed in storage module 204, CPU 200 may download at least a portion of the program code from storage module 204 into memory 202. As CPU 200 executes the program code, CPU 200 may also retrieve additional portions of program code from storage module 204.

Storage module 204 may provide mass storage for user terminal 112. Storage module 204 may be implemented with a variety of components or subsystems including, for example, a hard drive, an optical drive, CD ROM drive, DVD drive, a general-purpose storage device, a removable storage device, and/or other devices capable of storing information. Further, although storage module 204 is shown within user terminal 112, storage module 204 may be implemented external to user terminal 112.

Storage module 204 includes program code and information for user terminal 112 to communicate with service center 106. Storage module 204 may include, for example, data structures or program code for a calendar application, such as GroupWise™ provided by Novell Corporation™ or Outlook provided by Microsoft Corporation™; a client application, such as a Microsoft Network Messenger Service ("MSNMS") client or America Online Instant Messenger (AIM) client; and an Operating System ("OS"), such as the Windows Operation System provided by Microsoft Corporation. In addition, storage module 204 may include other program code and information, such as program code for TCP/IP communications; kernel and device drivers; configuration information, such as a Dynamic Host Configuration Protocol ("DHCP") configuration; a web browser, such as Internet Explorer™ provided by Microsoft Corporation, or Netscape Communicator™ provided by Netscape Corporation™; and any other software that may be installed on user terminal 112.

Network interface 206 provides a communications interface between user terminal 112 and data network 102. Network interface 206 may receive and transmit communications for user terminal 112. For example, network interface 206 may be a modem, or a LAN port.

Input interface 208 receives input from user 110 via input device 212 and provides the input to CPU 200. Input device 212 may include, for example, a keyboard, a microphone, and a mouse. Other types of input devices may also be implemented consistent with the principles of the present invention.

Output interface 210 provides information to user 110 via output device 214. Output device 214 may include, for example, a display, a printer, and a speaker. Other types of output devices may also be implemented consistent with the principles of the present invention.

Figure 3:
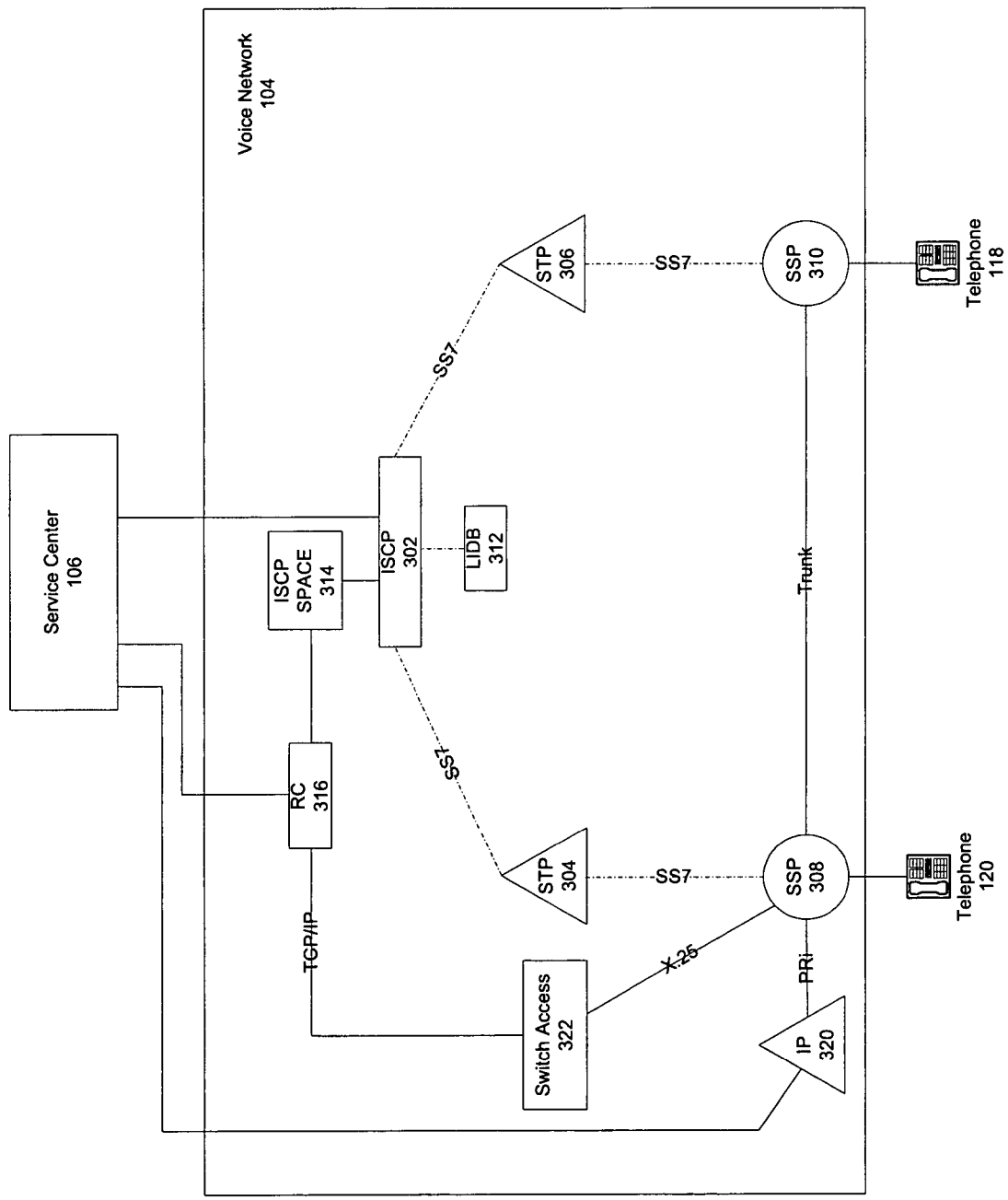
FIG. 3 is a diagram of a voice network, consistent with the principles of the present invention.

FIG. 3 is a diagram of a voice network, consistent with the principles of the present invention. As shown, voice network 104 includes an Intelligent Service Control Point ("ISCP") 302, Service Transfer Points ("STP") 304 and 306, service switching points ("SSP") 308 and 310, a Line Information Database ("LIDB") 312, an ISCP Service Provisioning And Creation Environment ("SPACE") 314, a Recent Change Environment ("RCE") 316, an Intelligent Peripheral ("IP") 320, and a switch access 322. Although this embodiment of a voice network 104 is described as a PSTN, as discussed above in other embodiments, voice network 104 may be, for example, a voice or video over broadband network a wireless broadband, a wireless voice network, etc.

Voice network 104 may be implemented using the PSTN and SS7 as a signaling protocol. The SS7 protocol allows voice network 104 to provide features, such as call forwarding, caller-ID, three-way calling, wireless services such as roaming and mobile subscriber authentication, local number portability, and toll-free/toll services. The SS7 protocol provides various types of messages to support the features of voice network 104. For example, these SS7 messages may include Transaction Capabilities Applications Part ("TCAP") messages to support event "triggers," and queries and responses between ISCP 302 and SSPs 308 and 310.

ISCP 302 may also be, for example, a standard service control point ("SCP") or an Advanced Intelligent Network ("AIN") SCP. ISCP 302 provides translation and routing services of SS7 messages to support the features of voice network 104, such as call forwarding. In addition, ISCP 302 may exchange information with the service center 106 using TCP/IP or SS7. ISCP 302 may include service logic used to provide a switch, such as SSP 308 or 310, with specific call processing instructions. ISCP 302 may also store data related to various features that a user may activate. Such features may include, for example, call intercept and voice mail. ISCP 302 may be implemented using a combination of known hardware and software. ISCP 302 is shown with a direct connection to service center 106 and a connection to ISCP SPACE 314, however, any number of network elements including routers, switches, hubs, etc., may be used to connect ISCP 302, ISCP SPACE 314, and service center 106. Further, information exchanged between the ISCP 302 and service center 106 may use, for example, the SR-3389 General Data Interface ("GDI") for TCP/IP.

STPs 304 and 306 relay SS7 messages within voice network 104. For example, STP 304 may route SS7 messages between SSPs 308 and 310. STP 302 may be implemented using known hardware and software from manufacturers such as NORTEL™ and LUCENT Technologies™.

SSPs 308 and 310 provide an interface between voice network 104 and phones 114 and 120, respectively, to setup, manage, and release telephone calls within voice network 104. SSPs 308 and 310 may be implemented as a voice switch, an SS7 switch, or a computer connected to a switch. SSPs 308 and 310 exchange SS7 signal units to support a telephone call between calling party 120 and user 110. For example, SSPs 308 and 310 may exchange SS7 messages, such as TCAP messages, within Message Signal Units ("MSU") to control calls, perform database queries to configuration database 312, and provide maintenance information.

LIDB 312 comprises one or more known databases to support the features of voice network 104. For example, LIDB 312 may include subscriber (i.e., a user that is a customer of a business entity providing services through one or more components of environment 100) information, such as a service profile, name and address, and credit card validation information. Although, in this figure, LIDB 312 is illustrated as directly connected to ISCP 302, LIDB 312 may be connected to ISCP 302 through an STP (e.g., 304 and 306). Additionally, this communication link may use, for example, the GR-2838 General Dynamic Interface ("GDI") for SS7.

ISCP SPACE 314 may be included as part of the ISCP 302 or be separate from the ISCP 302. For example, the Telcordia™ ISCP may include an environment similar to SPACE 314 as part of the product. Further, ISCP SPACE 314 may include one or more servers. ISCP SPACE 314 is the point in the ISCP platform where customer record updates may be made.

In one embodiment, customer records may be stored in ISCP SPACE 314 such that the records may be updated and sent to ISCP 302. These records may include information regarding how to handle calls directed to the customer. For example, these customer records may include information regarding whether or not calls for the customer are to be forwarded to a different number, and/or whether or not the call should be directed to an IP, such as a voice mail system, after a certain number of rings. Additionally, one ISCP SPACE 314 may provide updates to one or more ISCPs 302 via an ISCP network (not shown).

Additionally, voice network 104 may include one or more recent change engines 316 such as, for example, an Enterprise Recent Change engine ("eRC"); an Assignment, Activation, and Inventory System ("MIS"); or a Multi-Services Platform ("MSP"). As an example, the eRC and MIS may be used in voice networks 104 located in the western part of the United States, while an MSP may be used in networks in the eastern part. The recent change engines may be used to update switch and ISCP databases. For example, a recent change engine may deliver database updates to SSPs and to ISCPs, such that when updating databases, these recent change engines emulate human operators. Additionally, if the instructions are to be sent to an ISCP 302, the recent change engine may first send the instructions to ISCP SPACE 314, which then propagates the instructions to ISCP 302 as discussed above. Further, an MSP or eRC may be used, for example, for providing updates to both SSPs 308 or 310 and ISCPs 302. Or, for example, an eRC may be used for providing updates to SSPs 308 or 310, while an AAIS is used for providing updates to ISCPs 302.

Updates sent to SSPs 308 or 310 may be sent from the recent change engine 316 via a switch access 322 that may, for example, convert the updates into the appropriate protocol for SSP 308 or 310. For example, recent change engine 316 may send updates to SSPs 308 or 310 via TCP/IP. Switch access 322 may then convert the updates from TCP/IP to X.25. This switch access 322 may be implemented using hardware and/or software. These connections may include any number of elements, such as, for example, switches, routers, hubs, etc. and may be, for example, an internal data network for voice network 104.

Voice network 104 may also include one or more IPs. For example, in FIG. 3, an IP 320 is illustrated as being connected to SSP 308. These IPs may be used for providing functions for interaction between users and the voice network, such as voice mail services, digit collection, customized announcements, voice recognition, etc. Moreover, the communications between SSP 308 and IP 320 may use the Primary Rate interface ("PRi") (e.g., the 1129 protocol) protocol. Additionally, the IP 320 may be capable of sending and receiving information to/from the Service Center 106. These communications may use, for example, the SR-3511 protocol. Further, although FIG. 3 illustrates this connection as a direct connection, this connection may include any number of elements including routers, switches, hubs, etc., and may be via, for example, an internal data network for voice network 104.

Figure 4:
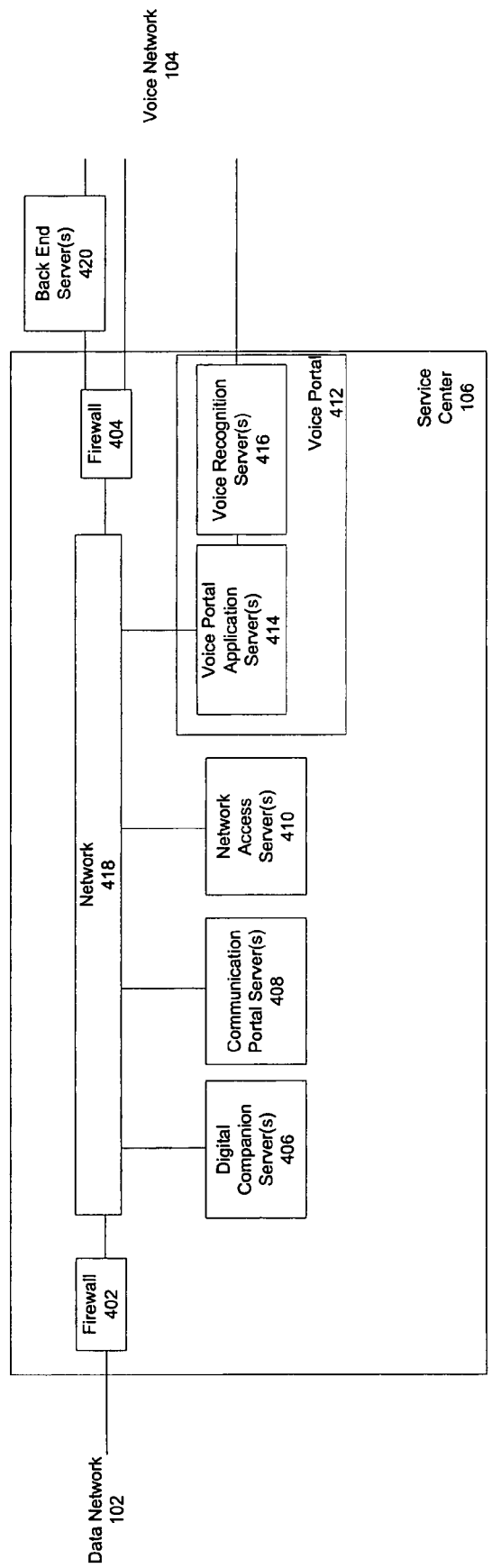
FIG. 4 is a block diagram of a service center, consistent with the principles of the present invention.

FIG. 4 is a block diagram of a service center, consistent with the principles of the present invention. As shown, service center 106 may include firewalls 402 and 404, one or more digital companion servers 406, one or more communication portal servers 408, one or more network access servers 410, and a voice portal 412. The voice portal 412 may include a voice portal application server 414 and a voice recognition server 416. A network 418 may be used to interconnect the firewalls and servers. Additionally, back end server(s) 420 may be provided between the service center 106 and the voice network 104.

Firewalls 402 and 404 provide security services for communications between service center 106, data network 102, and voice network 104, respectively. For example, firewalls 402 and 404 may restrict communications between user terminal 112 and one or more servers within service center 106. Any appropriate security policy may be implemented in firewalls 402 and 404 consistent with the principles of the present invention. Firewalls 402 and 404 may be implemented using a combination of known hardware and software, such as the Raptor Firewall provided by the Axent Corporation. Further, firewalls 402 and 404 may be implemented as separate machines within service center 106, or implemented on one or more machines external to service center 106.

Network 418 may be any appropriate type of network, such as an Ethernet or FDDI network. Additionally, network 418 may also include switches and routers as appropriate without departing from the scope of the invention. Further, additional firewalls may be present in network 418, for example, to place one or more of servers 406, 408, 410, or voice portal 412 behind additional firewalls.

Each server (406, 408, 410, 414, 416, 420) may be any appropriate type of server or computer, such as a Unix or DOS-based server or computer. The servers may implement various logical functions, such as those described below. In FIG. 4, a different server is illustrated as being used for each logical function. In other embodiments, the logical functions may be split across multiple servers, multiple servers may be used to implement a single function, all functions may be performed by a single server, etc.

In general, a digital companion server 406 may provide the software and hardware for providing specific services of the service center. Exemplary services include, for example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, real-time call management, etc. In one embodiment, real-time call management enables a user to perform several functions as a call is being received, such as sending a call to voice mail, sending a call received on one device to another device, manually initiating protection from telemarketers, playing an announcement for the caller, scheduling a call back, bridging a caller onto a current call, etc.

A communication portal server 408 may provide the hardware and software for managing a customer's account and interfacing with customer account information stored by the provider of customer's voice network 104. The network access servers 410 may provide the hardware and software for sending and receiving information to the voice network 104 in processing the applications provided by the service center. For example, the network access servers 410 may be used for transmitting and/or receiving information from/to an ISCP 302 or an SSP 308 or 310 of the voice network 104.

Voice portal 412 includes software and hardware for receiving and processing instructions from a customer via voice. For example, a customer may dial a specific number for voice portal 412. Then the customer using speech may instruct the service center 105 to modify the services to which the customer subscribes. Voice portal 412 may include, for example, a voice recognition function 416 and an application function 414. Voice recognition function 416 may receive and interpret dictation, or recognize spoken commands. Application function 414 may take, for example, the output from voice recognition function 416, convert it to a format suitable for service center 106 and forward the information to one or more servers (406, 408, 410) in service center 106.

Figure 5:
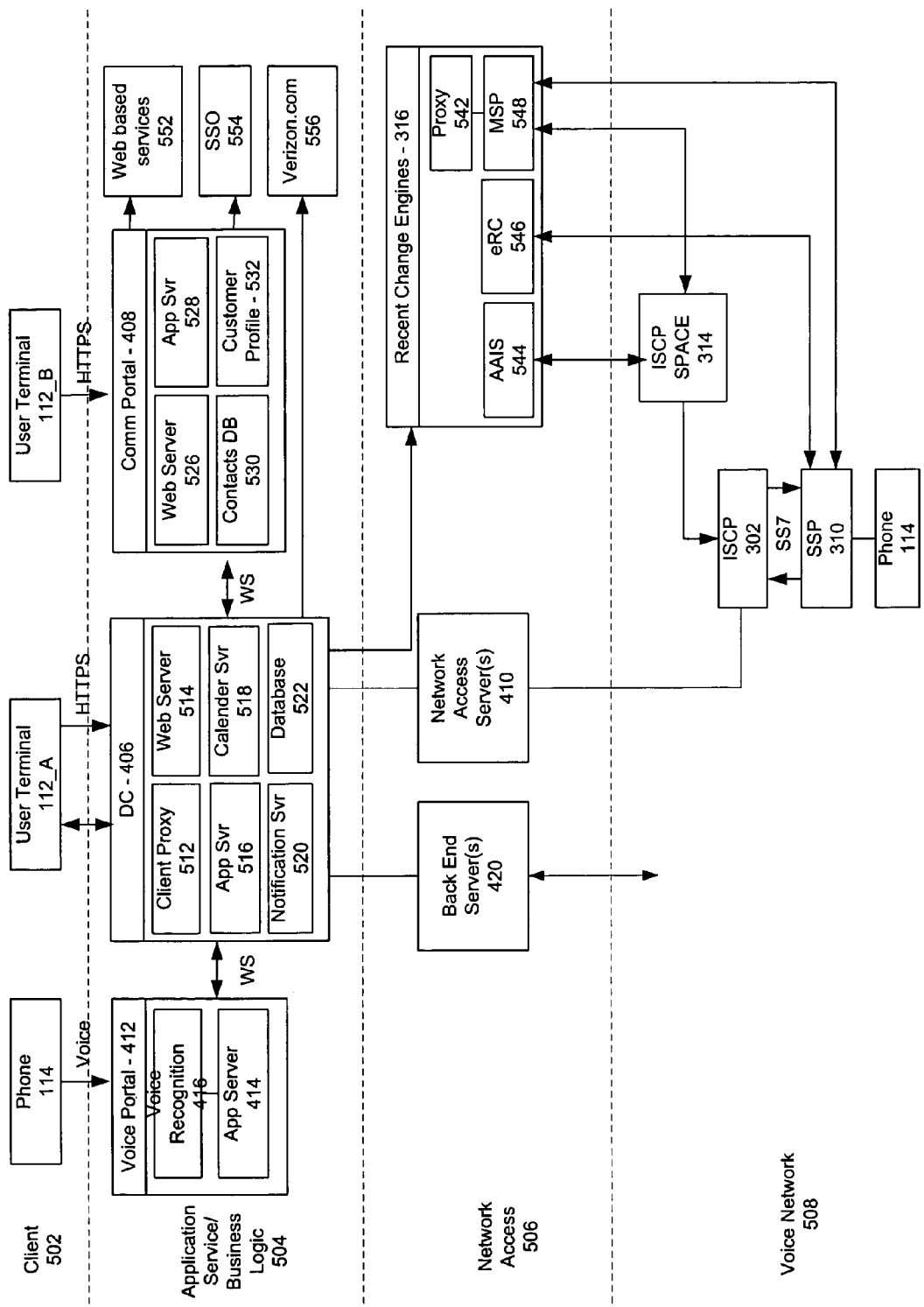
FIG. 5 illustrates a logical architecture of an exemplary system, consistent with the principles of the present invention.

FIG. 5 illustrates a logical architecture of an exemplary system, consistent with the present invention. As illustrated, the logical architecture may be split into four planes: client side plane 502, application service plane 504, network access plane 506, and voice network plane 508.

Client side plane 502 includes user terminals 112_A and 112_B that a user may use to send and/or receive information to/from the service center 106. Additionally, client side plane 502 includes the user's phone(s) 114. As discussed above, user terminals 112 may be any type of device a user may use for communicating with service center 106. For example, user terminal 112_A may be a PDA running a program for communicating with service center 106, while user terminal 112_B may be a desktop type computer running a web browser for communicating with the service center 106 via the Internet. Additionally, the user may have one or more phones 114, such as, for example, one or more standard landline telephones and/or wireless phones.

Application service plane 504 includes digital companion server(s) 406, communication portal server(s) 408, and voice portal 412. These entities may communicate between one another using, for example, web services or any other suitable protocols. Web services are a standardized way of integrating Web-based applications using XML, Simple Object Access Protocol ("SOAP"), Web Services Description Language ("WSDL") and Universal Description, Discovery and Integration ("UDDI") open standards over an Internet protocol backbone.

As illustrated, a digital companion server 406 may provide the following functions: a client proxy function 512, a web server function 514, an application server function 516, a calendar server function 518, a notification server function 520, and a database function 522. Each of these functions may be performed in hardware, software, and/or firmware. Further, these functions may each be executed by a separate server, split across multiple servers, included on the same server functions, or any other manner.

Client proxy function 512 provides a proxy function for the digital companion that may be used for security purposes. Client proxy function 512 may be included in a separate server such that all communications sent from the other digital companion functions/servers to a user terminal 112 via data network 102 go through client proxy 512. Also, if client proxy 512 is included on a separate server, for example, an additional firewall may be provided between client proxy 512 and the other digital companion servers to provide additional security.

Web server function 514 provides functionality for receiving traffic over data network 102 from a customer. For example, web server function 514 may be a standard web server that a customer may access using a web browser program, such as Internet Explorer or Netscape Communicator.

Application server function 516 encompasses the general functions performed by digital companion server(s) 406. For example, these functions may include interfacing with the various other digital companion functions to perform specific services provided by the service center. These services may include, for example, interfacing with other function(s), software, and/or hardware to provide a customer with the capability of managing their calls online. Such services may include, for example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, enabling call management with user intervention in real-time, etc.

Additionally, application server function 516 may interface with one or more external devices, such as an external web server, for retrieving or sending information. For example, application server function 516 may interface with a voice network's data center 556 (e.g., verizon.com) to determine the services to which the customer subscribes (e.g., call waiting, call forwarding, voice mail, etc.).

Calendar server function 518 may provide the capability of scheduling events, logging when certain events occurred, triggering the application-functions to perform a function at a particular time, etc. In one aspect of the invention, calendar server function 518 generates and maintains a scheduling data structure, such as a user calendar that includes scheduling events (e.g., meetings, tasks, etc.), that are created by the user through user terminal 112_A. For example, a user may schedule a conference call event in a calendar application reflecting a time and date when the user is to participate in a conference call that is be established in accordance with certain aspects related to the present invention. Calendar server function 518 may operate with, or leverage, application server function 516 to initiate conference call configuration processes consistent with aspects of the invention.

Notification server function 520 provides the capability to send information from the service center 106 to a user terminal 112. For example, the notification server function 520 at the direction of the application server function 516 may send a notification to the user terminal 112 that the user is presently receiving a phone call at the user's phone 114. This notification may be, for example, an instant message pop-up window that provides an identification of the caller as well as the number being called. The notification may also have a number of user-selectable buttons or items associated with it that enable the user to manage a call in real-time.

Database function 522 provides the storage of information useable by the various applications executed by the digital companion servers. These databases may be included in, for example, one or more external storage devices connected to the digital companion servers. Alternatively, the databases may be included in storage devices within the digital companion servers themselves. The storage devices providing database function 522 may be any type of storage device, such as for example, CD-ROMs, DVD's, disk drives, magnetic tape, etc.

As discussed above, communication portal server(s) 408 provide the hardware and software for managing a customer's account and interfacing with customer account information stored by the provider of customer's voice network 104. As illustrated in FIG. 5, a communication portal server 408 may provide the following functions: a web server function 526, an application server function 528, a contacts database function 530, and/or a customer profile function 532. Each of these functions may be performed by a separate server, split across multiple servers, included on the same server functions, or any other manner.

Web server function 526, as with web server function 514 of the digital companion servers, provides functionality for receiving traffic over data network 102 from a customer. For example, the web server may be a standard web server that a customer may access using a web browser, such as Internet Explorer or Netscape Communicator.

Application server function 528 encompasses the general functions performed by communication portal servers 408. For example, these functions may include interfacing with the voice network to retrieve and/or modify customer profile information, and creating and editing an address book for the user. Additionally, application server function 528 may include the functionality of sending and/or receiving information to/from external servers and/or devices. For example, communication portal servers 408 may be connected to a network, such as, the Internet. Application server function 528 may then provide connectivity over the Internet to external servers 552 that provide web services, such as the Superpages web page. Application server function 528 could then contact these external services 552 to retrieve information, such as an address for a person in the user's address book.

In another example, application server function 528 of communication portal 408 may interface a Single Sign On ("SSO") server 554. SSO 554 may be used to allow users to access all services to which the user subscribes, on the basis of a single authentication that is performed when they initially access the network.

Moreover, application server function 528, similar to application server 516, may provide functionality to facilitate services performed by the service center. These services may include, for example, interfacing with other function(s), software, and/or hardware to provide a customer with the capability of managing their calls online. For example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, enabling call management with user intervention in real-time, etc.

Contacts database function 530 includes storage devices for storing an address book for the user. This address book may be any appropriate type of address book. For example, the user's address book may include the names, phone numbers, and addresses of people and/or organizations. These storage devices may be internal or external to communication portal servers 406 or some combination in between. In addition, these storage devices may be any type of storage device, such as magnetic storage, memory storage, etc.

Customer profile database function 532 includes storage devices for storing customer profile information for the user. These storage devices may be the same or separate storage devices used for the contacts database. The customer profile may include information regarding the user's account for their voice network. For example, this information may include the user's name, billing address, and other account information. Additionally, the customer profile may include information regarding voice services to which the user subscribes, such as, for example, call waiting, voice mail, etc.

Application services plane 504 of the architecture may also include a voice portal 412. As discussed above, the voice portal 412 may include, for example, a voice recognition function 416 and an application server function 414, and be used for receiving and processing instructions from a customer via voice. The voice recognition function may be implemented using hardware and/or software capable of providing voice recognition capabilities. This hardware and/or software may be a commercially available product, such as the Voice Application platform available from Tellme Networks, Incorporated. Application server function 414 of voice portal 412 may include hardware and/or software for exchanging information between digital companion servers 406 and voice recognition function 416. Additionally, application server function 414 may be included on a separate server, included in the hardware and software providing voice recognition function 416, included in digital companion servers 406, etc.

Network access plane 506 of the architecture includes the functions for providing connectivity between application service plane 502 and voice network 104. For example, this plane may include recent change engines 316, network access servers 410, and/or back end servers 420.

As discussed above, recent change engines 316 may be used to update switches and ISCP databases included in the voice network 104. In one embodiment, recent change engines 316 may include an MIS 544, an eRC 546, and/or an MSP 548. Additionally, a proxy 542 may be used between the digital companion servers 406 and recent change engines 542 for security purposes.

Network access servers 410 may be included in the service center 106 and may provide the hardware and software for sending and receiving information to voice network 410 in processing the applications provided by the service center. For example, network access servers 410 may include a Caller ID ("CID") functionality for retrieving caller ID information from voice network 104, a Click To Dial ("CTD") functionality for instructing an intelligent peripheral in the voice network to place a call via an SSP, and/or a Real Time Call Management ("RTCM") functionality for interfacing with an ISCP of the voice network.

Network access plane 506 may also include one or more back end server(s) 420. These back end server(s) 420 may include hardware and/or software for interfacing service center 106 and voice network 104. Back end server(s) 420 may be connected to service center 106 by a network, by a direct connection, or in any other suitable manner. Further, back end server(s) 420 may connect to one or more devices in voice network 104 by a network, a direct connection, or in any other suitable manner.

Back end server(s) 420 may include, for example, a server providing a voice mail retrieval and notification function. This voice mail retrieval and notification function may include the capability to receive notifications when a user receives a voice mail, physically call a user's voice mail system, enter the appropriate codes to retrieve the voice mail, retrieve the voice mail, convert the voice mail to a digital file, and send it to digital companion servers 406.

Additionally, these back end server(s) 420 may also include, for example, a directory assistance server. This directory assistance server may interface service center 106 with a Reverse Directory Assistance Gateway ("RDA Gateway") of the voice network 104. An RDA Gateway is a device for issuing requests to a Data Operations Center ("DOC") of voice network 104 for name and/or address information associated with a phone number and receiving the name and/or phone number in response to this request.

In another example, back end server(s) 420 may include a wireless internet gateway that is used for interfacing with a Mobile Switching center ("MSC") of a wireless voice network. As with the above-described back end server(s) 420, this wireless internet gateway may be used for converting requests and information between the formats used by service center 106 and those used by the wireless voice network.

In yet another example, back end server(s) 420 may include a Single Number Short Message Service ("SN SMS") server for interfacing service center 106 with a Short Message Service ("SMS") gateway in voice network 104. This may be used to permit the customer to have SMS messages addressed to their home phone number directed to an SMS capable device of the users choosing.

Also, back end server(s) 420 may include a conference blasting server for instructing a conference bridge in voice network 106 to dial out via an SSP to the participants of a voice conference. Alternatively, for example, back end server(s) 420 may include a server for instructing an IP of the voice network to place a call between two parties by dialing out to each of the parties. The back end server(s) may also include the capability to instruct the bridge or IP device to call an audio digitizing device that can listen to the conference, convert the audio signals to digital format, and forward the digitized signals to a user device via, for example, an audio streaming server. The audio streaming server may, for example, allow a user to connect to it via, for example, the Internet. Additionally, the audio streaming device may buffer or record the signals to permit the user to pause, rewind, and/or fast-forward thru the conference.

Voice network plane 508 includes the hardware and software included in the voice network 104, as discussed above with reference to FIG. 3. For example, voice network plane 508 may include ISCP SPACE 314, ISCP 302, intelligent peripherals 320, and SSP 308. Additionally, voice network plane 508 may also include the hardware and software included in a wireless carrier's network, such as, for example, the mobile switching center, etc.

Conference Call System Overview

As explained, methods and systems consistent with certain aspects related to the present invention provide an environment from which a user may manage several different features associated with communicating over a telecommunications and/or information exchange network. Among those features are one or more conference call processes that automatically configure and maintain conference calls for a subscriber user through the subscriber user's scheduling calendar and/or address book. In one aspect of the invention, the conference call processes allow the subscriber user to schedule a conference call event that includes one or more other participant users. The processes automatically establish a conference call between the users at the scheduled time and/or date scheduled by the subscriber user.

Figure 6:
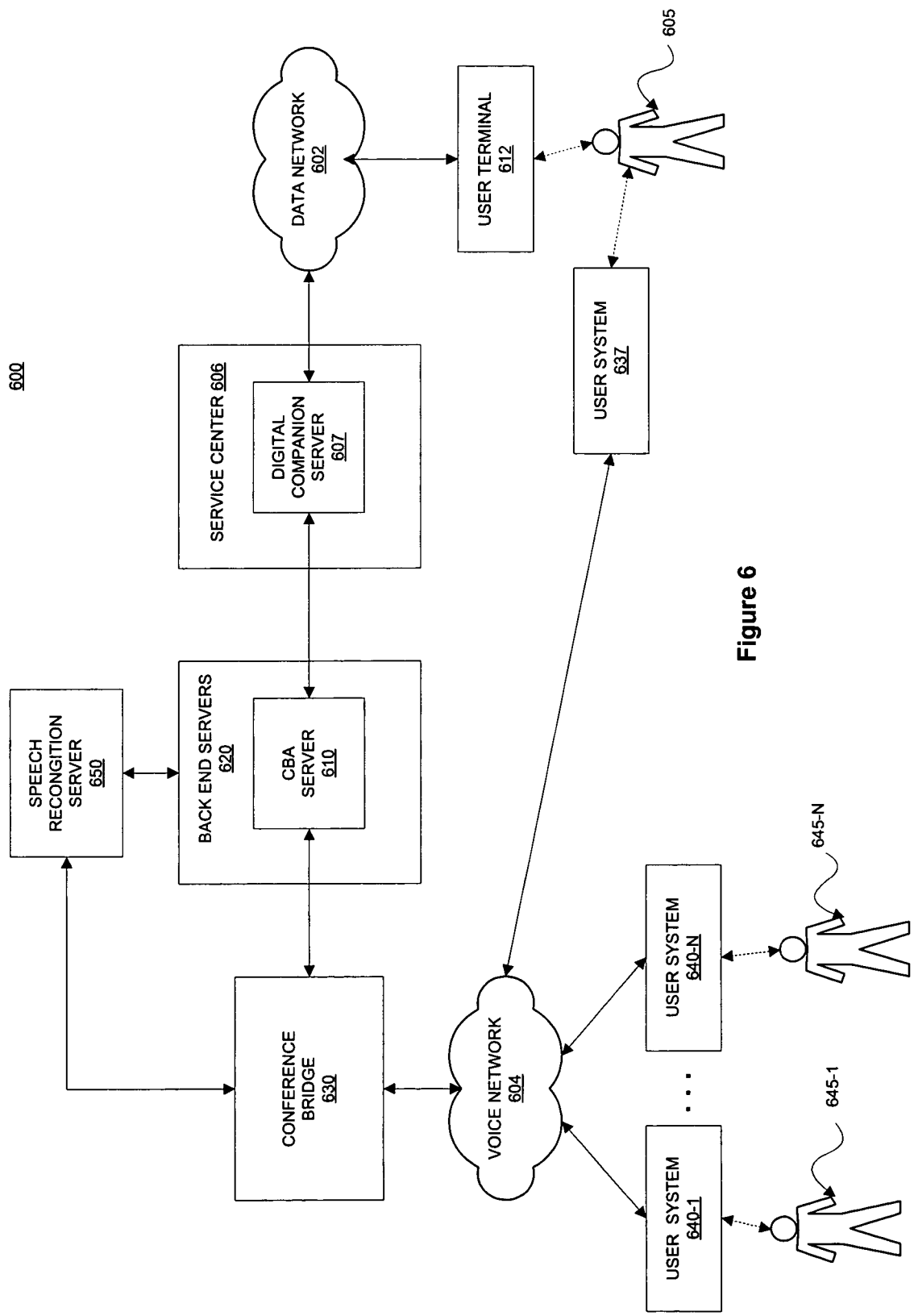
FIG. 6 is a diagram of an exemplary conference call environment consistent with the principles of the present invention.

FIG. 6 shows an exemplary network environment 600 that performs the conference call processes consistent with certain aspects related to the present invention. As shown, environment 600 includes data network 603, voice network 604, service center 606, user terminal 612, back-end servers 620, conference bridge 630, user systems 637 and 640-1 to 640-N, users 645-1 to 645-N, and speech recognition server 650.

User terminal 612 is a terminal operated by a subscriber user 605 that is configured and operates in a manner consistent with user terminal 112 shown in FIG. 1. Data network 602 is a network that provides communications between various entities in environment 600, such as user terminal 612 and server center 606, in a manner consistent with data network 102 described above in connection with FIG. 1. Voice network 602 is a telephony-based network that provides communications between selected entities in environment 600, such as users 645-1 to 645-N and conference bridge 630 in a manner consistent with voice network 104 described above in connection with FIG. 1.

Service center 606 provides a platform for managing communications over data network 602 and voice network 604 in a manner consistent with service center 106 described above in connection with FIG. 1. In one aspect of the invention, server center 606 includes Digital Companion Server ("DCS") 607 that provides customer related services in a manner consistent with digital companion server 406 described above in connection with FIGS. 4 and 5.

Back end servers 620 may be one or more computing systems that interface service center 606 and voice network 604. Back end servers 620 may include hardware and/or software and operates in a manner consistent with back-end servers 420 described above in connection with FIG. 5. In one aspect of the invention, back end servers 620 includes a Conference Blasting Application ("CBA") server 610 that executes software to perform one or more conference call processes, including a process that generates messages used by environment 600 to set up a conference call associated with subscriber user 605.

Conference bridge 630 is a network bridge that establishes communications between selected ones of users 645-1 to 645-N and subscriber user 605. In one aspect of the invention, conference bridge 630 receives instructions from DCS 607 to set up conference calls in accordance with a conference call event configured by DCS 607. Further, conference bridge 630 provides telecommunication services associated with one or more calls during a conference call process.

User systems 640-1 to 640-N may be communication systems operated by respective users 645-1 to 645-N. Through user systems 640-1 to 640-N and voice network 604, users 645-1 to 645-N may communicate with each other using one or more types of communication devices. Accordingly, user systems 640-1 to 640-N may represent telephony based devices, such as wireline or wireless telephones. Alternatively, user system 640-1 to 640-N may represent user terminals that operate in a manner consistent with user terminal 612. User 605 may also communicate with users 640-1 to 640-N through user system 637 and voice network 604.

Speech recognition server 650 is a computing system that converts audio information provided by conference bridge 630 into speech information. Server 650 transcribes the speech information into text data that is stored in one or more data storage devices (not shown). In one aspect of the invention, speech recognition server 650 is located external to any components of environment 600. Alternatively, server 650 may be included as a server within back end servers 620.

In one aspect of the invention, user 605 may be a subscriber to one or more services offered by service center 606. That is, user 605 may be a user that registers with a business entity associated with service center 606 to receive one or more communication services offered by the components of environment 600, such as service center 607. For example, user 605 may be a subscriber to service center 606 to receive calls through a preferred device. A preferred device is one of a plurality of communication and/or computing devices associated with the subscriber (e.g., user 605). Such devices include, for example, PDAs, wireless telephones, wireline telephones, etc. In one aspect of the invention, service center 607 may receive information pertaining to a call directed to user 605 from a calling party, and retrieve data corresponding to user 605 using the received information. Service center 607 may determine a preferred device of user 605 based on the retrieved information. Thereafter, service center 607 may ascertain whether the preferred device of the user requires a new mode of delivery, and if so, routes the call to the preferred device of the user to be compatible with the new mode of delivery. The methods and systems associated with the preferred device aspects related to the present invention are further described in U.S. patent application Ser. No. 10/720, 633, entitled "METHODS AND SYSTEMS FOR AUTOMATIC FORWARDING OF CALLS TO A PREFERRED DEVICE," which has been previously hereby incorporated by reference in its entirety.

Conference Call Processes

Figure 7:
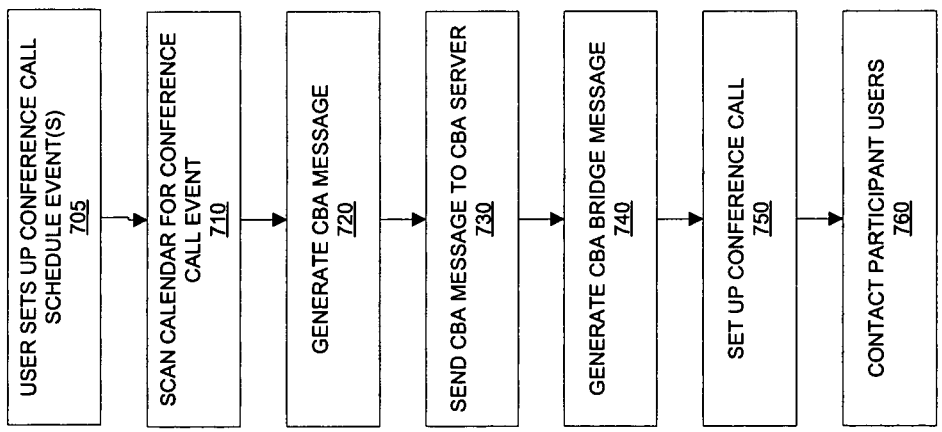
FIG. 7 is a diagram of an exemplary flowchart of a conference call configuration process consistent with the principles of the present invention.

Methods and systems consistent with certain aspects of the present invention automatically configure and maintain a conference call between user 605 and one or more users 645-1 to 645-N. FIG. 7 is a flowchart of an exemplary conference call configuration process that may be performed by environment 600. In one aspect of the invention, user 605 may set up one or more conference call scheduling events through user terminal 612 and service center 606 (Step 705). For example, user 605 may access a calendar application and an address book provided by service center 606 to add participant users to a proposed conference call meeting. To do so, in one example, user 605 may access participant user information displayed in a graphical representation of an address book corresponding to user 605 Using an input device (e.g., a mouse, stylus, etc.), user 605 may select profile information for a participant user (e.g., user 645-1) from the address book and drop it in a conference call icon included in the calendar application for a proposed time and date (e.g., Monday, Dec. 7, 2003, 9:00 AM EST). Alternatively, user 605 may select a date and time for a proposed conference call and add participant users to a participant list provided in graphical form on the display device in user terminal 612. In one aspect of the invention, service center 606 employs an application server function (e.g., application server function 516) within DCS 607 to allow user 605 to schedule a conference call to take place at a specific time and date. One skilled in the art will appreciate, however, that different mechanisms and methods may be employed by environment 600 to enable user 605 to schedule a conference call with one or more participant users 645-1 to 645-N without departing from the scope of the invention.

Periodically, DCS 607 may scan the calendar application associated with user 605 to determine whether a conference call event is detected (Step 710). The conference call event may act as a trigger that directs DCS 607 to automatically set up a conference call for user 605. For example, DCS 607 may determine whether a current date and time matches, or is within some predetermined range of, a scheduled conference call for user 605. For instance, suppose user 605 previously scheduled a conference call with three participant users listed in user 605's address book for a particular date (e.g., Monday, Nov. 17, 2003, at 10:00 AM EST). On that date and/or time (i.e., Nov. 17, 2003), or sometime earlier, a DCS 607 function, such as calendar service function 518, may trigger a conference call event that instructs DCS 607 to begin configuring a conference call in accordance with the particulars set up by user 605 and represented in the user's calendar.

Once a conference call event is detected, DCS 607 generates a Conference Blasting Application ("CBA") message (Step 720). The CBA message includes profile information for each participant user included in a participant list associated with the detected scheduled conference call. For example, DCS 607 may collect the telephone numbers and identifiers for each participant user and add them to the CBA message. Once the CBA message is generated, DCS 607 formats the message for an appropriate transmission protocol and sends the message to CBA server 610 (Step 730). In one aspect of the invention, DCS 607 may format the CBA message into an XML message and transmit the message to CBA server 610 using TCP/IP protocol. Other types of transmission protocols and information formats, however, may be implemented by service center 606 and DCS 607 to transport the CBA message to CBA server 610.

CBA server 610 may extract the information included in the CBA message to generate a CBA bridge message (Step 740). A CBA bridge message is a set of commands that are directed to a specific bridge (e.g., conference bridge 630) that instructs the bridge to set up a conference call by dialing out to the participant user's identified in the CBA message. In one aspect of the invention, CBA server 610 may determine which one a plurality of bridges (not shown) in environment 600 is configured to handle conference call communications with any of users 645-1 to 645-N. CBA server 610 may identify conference bridge 630 as being dedicated to handle conference call operations and thus generate a CBA message based on the identification of bridge 630. That is, CBA server 610 may format a message that includes one or more commands directed to conference bridge 630.

Conference bridge 630 receives the CBA bridge message and, based on the commands included in the message, sets up a conference call that includes user 605 and any participant users identified in the CBA bridge message (Step 750). In one aspect of the invention, conference bridge 750 collects the telephone number for each participant user 645-1 to 645-N from the CBA bridge message. Once the conference call is configured, conference bridge 630 uses the collected telephone numbers to establish a connection with participant users 645-1 to 645-N (Step 750). In one aspect of the invention, conference bridge 630 may dial out to each user system 640-1 to 640-N operated by a participant user 645-1 to 645-N using the signaling protocols and/or components implemented by voice network 604, such as SCPs, SSPs, SCPs, ISCPs, SS7 protocol infrastructures, etc.

In one aspect of the invention, one or more participant users 645-1 to 645-N may be subscribers to service center 606. Accordingly, when generating the CBA message, DCS 607 may determine whether a participant user is a subscriber to service center 606. If so, DCS 607 may determine whether the subscriber participant user 645-1 to 645-N has subscribed for a preferred device service, (i.e., a Digital Companion (DC) user). In such a case, DCS 607, through components of service center 606 and/or DCS 607 (e.g., network access servers 410, application server 516, etc.) formats the CBA message to reflect the type of preferred device by which the subscriber participant user prefers to be contacted. For example, if the subscriber participant user indicates a desire to be contacted via a PDA, service center 606 formats the CBA message to include the contact information required to establish a connection with the subscriber participant user's PDA. Further, if the type of delivery mode requires adjustment because of the type of preferred device indicated by the subscriber participant user, DCS 607 may format the CBA message to reflect the type of delivery mode that is to be used to establish contact with the subscriber participant user. The manner by which DCS 607 determines and establishes communications with a subscriber participant user having a preferred device service may be consistent with the features and processes described in U.S. patent application Ser. No. 10/720,633, entitled "METHODS AND SYSTEMS FOR AUTOMATIC FORWARDING OF CALLS TO A PREFERRED DEVICE," previously referenced and incorporated by reference.

Figure 8:
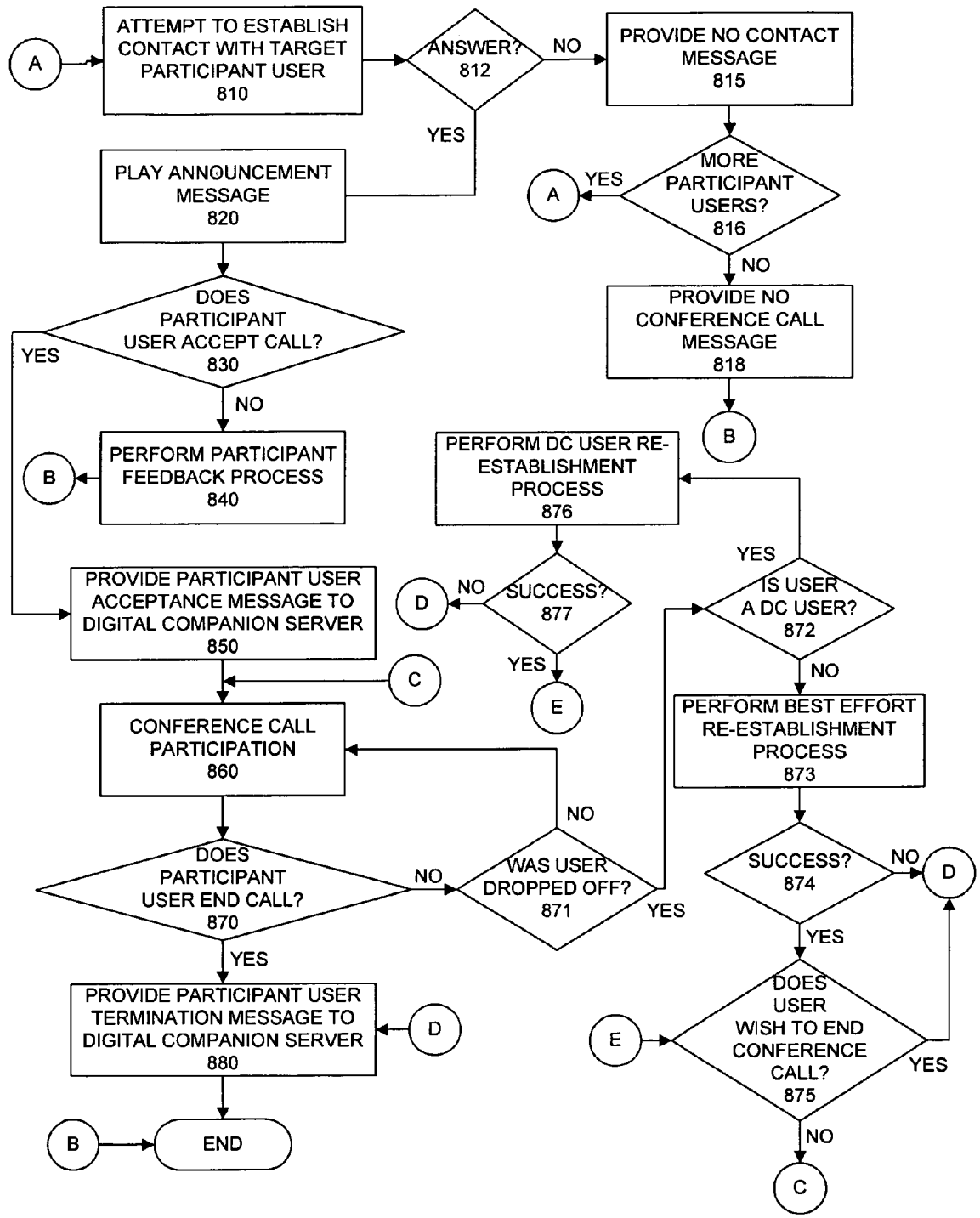
FIG. 8 is a diagram of an exemplary flowchart of a conference call process consistent with the present invention.

Once communication is established with a participant user (e.g., user 645-1), methods and system consistent with certain aspects related to the present invention may perform a conference call process. FIG. 8 shows a flowchart of an exemplary conference call process that may be performed by one or more components of environment 600 in a manner consistent with certain aspects related to the present invention. As shown, the conference call process may begin when conference bridge 630 attempts to establish communication contact with a target participant user (e.g., user 645-1) by calling the participant user's corresponding user system (e.g., user system 640-1) (Step 810). If the target participant user does not answer the conference call from bridge 630 (Step 812; NO), conference bridge 630 may generate and provide a NO CONTACT message to DCS 607 through CBA server 610 (Step 815).

In one aspect of the invention, the NO CONTACT message may indicate to DCS 607 that the target participant user did not answer the conference call. Additionally, the NO CONTACT message may also identify the target participant user, the telephone number called, the time called, and any other type of information associated with the attempted conference call contact operation. DCS 607 may generate a DCS NO CONTACT message including some or all of the NO CONTACT message information provided by bridge 630, and send the DCS NO CONTACT message to user terminal 612 through data network 602. Alternatively, or additionally, DCS 607 may provide the DCS NO CONTACT message information to conference bridge 630 through CBA server 610. Bridge 630 may provide the NO CONTACT information to user 605 through user system 637 in, for example, voice format. In another aspect of the invention, conference bridge 630 may provide the NO CONTACT message information to user system 637 upon determining that the target participant user did not answer the conference call. One skilled in the art will appreciate that the above described examples are not intended to be limiting and that methods and system consistent with aspects of the present invention may use other types of messages, information, and components to notify user 605 of the unanswered conference call.

Following the generation and provision of the no-contact message, conference bridge 630 may determine whether there are any more participant users included in the scheduled conference call that bridge 630 has not yet contacted (Step 816). If so (Step 816; YES), bridge 630 attempts to establish contact with the new target participant user (Step 810). On the other hand, if conference bridge 630 has attempted to contact every participant user identified in the CBA bridge message for the conference call, and none of the users have answered the call (or communication could not be established for another reason) (Step 816; NO), conference bridge 630 may generate a no conference call message to DCS 607 indicating that the scheduled conference call can not be processed because of the lack of participant users (Step 818). In one aspect of the invention, DCS 607 may provide the no conference call message to user terminal 612 in a manner similar to that described above in connection with the NO CONTACT message. Further, bridge 630 may provide the no conference call message to user system 637 in a manner similar to that described above in connection with the NO CONTACT message.

Referring back to FIG. 8, if a target participant user did answer the conference call (Step 812; YES), conference bridge 630 may generate and play one or more announcements to the target participant user (via the user's corresponding user system) (Step 820). The announcement may include a voice message indicating to the participant user that the target participant user is scheduled to participate in a scheduled conference call. The announcement may also identify other participant users (e.g., 645-N) and the user initiating the conference call (e.g., user 605). Other types of announcements may be provided by conference bridge 630 that include additional information associated with the conference call, such as subject of the call, a proposed agenda, etc. Also, additional messages may be provided to user 605, such as a message indicating that a conference call has been configured in accordance with a scheduled conference call prevoiously set up by user 605 through service center 606. Further, other components of environment 600 (shown or not shown in FIG. 6) may provide the one or more announcements to the participant user. That is, conference bridge 630 may leverage another processing component to provide conference call participant announcements to participant users 645-1 to 645-N.

Additionally, the announcements may be pre-configured and/or selected by user 605 using service center 606. In one example, when scheduling a conference call, user 605 may provide service center 606 with a pre-configured announcement that is used by conference bridge 630 when a participant user answers a conference call. In this instance, DCS 607 may include the pre-configured announcement in the CBA message provided to CBA server 610. And, in turn, CBA server 610 may include the pre-configured announcement message in the CBA bridge message provided to conference bridge 630. In another aspect of the invention, conference bridge 630 may provide a generic conference call announcement that is common to other conference calls established by bridge 630 prior to, during, or subsequent to, the conference call established for user 605 in the conference call process described in connection with FIGS. 7 and 8.

Upon answering the conference call, the target participant user may have the option of accepting or not accepting the call. If the target participant user accepts the call (Step 830; YES), the conference call process proceeds at Step 850, described below. If, on the other hand, the target participant user does not accept the conference call (Step 830; NO), conference bridge 630 may perform a participant feedback process consistent with certain aspects of the present invention (Step 840).

The participant feedback process provides the target participant user one or more options for refusing the conference call. For example, bridge 630 may provide a feedback message to the target participant user including a list of options the target participant user may select to refuse the call. These options may include refusing the conference call outright (i.e., do not accept the call and hang up), leave a message for the initiating user (e.g., user 605), set an alternate telephone number or preferred device to contact the target participant user, and instruct the conference bridge 630 to dial back in a user-specified amount of time (e.g., a number of minutes). The target participant user may make the appropriate selection using voice commands and/or Dual Tone Multi-Frequency ("DTMF") responses that are processed by conference bridge 630 using speech recognition and/or DTMF processes, respectively.

If the target participant user refuses the conference call, conference bridge 630 may generate and provide a refusal message to user 605 through user system 637 by way of voice network 604 and/or user terminal 612 by way of CBA server 610 and DCS 607. Alternatively, if the target participant user wishes to leave a message for user 605, conference bridge 630 may record the target participant user's response to the conference call and provide the response to user 605 in a similar manner (e.g., via user system 637 and/or user terminal 612). Also, if the target participant user wishes to instruct bridge 630 to call them back using an alternate telephone number, conference bridge 630 may receive the alternate number from the target participant user and attempt to re-establish the conference call connection with the target participant user based on the alternate number (Step 810). Moreover, if the target participant user instructs bridge 630 to call back, bridge 630 may request and record a specified period of time that bridge 630 is to attempt to contact the target participant user. When the specified period of time expires, bridge 630 may perform Step 810 to re-execute the conference call process for that target participant user.

It should be noted that conference bridge may offer and perform any of the feedback process options individually or in combination with each other. That is, bridge 630 may allow the target participant user to set an alternate telephone number and instruct bridge 630 to call back in a specified period of time. Further, the participant feedback process options described above are exemplary and not intended to be limiting, thus conference bridge 630 may offer and process other options associated with a target participant user's refusal to accept a conference call. Once the participant feedback process is completed, the conference call process may end.

Referring back to FIG. 8, if the target participant user accepts the conference call (Step 830; YES), conference bridge 630 may generate and provide a participant user acceptance message to DCS 607 (Step 850). The acceptance message includes information reflecting the target participant user's acceptance of the call. This information may also include information identifying the target participant user, the status of the target participant user's acceptance of the call, and any other type of information associated with the conference call and/or the target participant user. For example, the acceptance message may include voice or text information indicating that the target participant user has accepted the conference call and is joining in the conference initiated by DCS 607. The target participant user may be identified by a conference call identifier, the participant user's name, and/or the participant user's telephone number. DCS 605 forwards this information to user 605 in the appropriate format through user terminal 612. Alternatively, or additionally, conference bridge 630 may provide the acceptance message to user 605 through user system 637 and voice network 604.

Once the target participant user accepts the conference call, the user may participate in the conference with user 605 and any other participant users (645-1 to 645-N) that have also joined the call (e.g., 860). During the conference call, conference bridge 630 may detect a disconnection event reflecting a condition when the target participant user's connection with conference bridge 630 has been terminated.

Termination of the participant user's call may be the result of many actions. For instance, the participant user may have ended the call voluntarily (e.g., hung up) or the connection between the participant user and conference bridge 630 may have been terminated for unwanted reasons (i.e., dropped off, line disconnections, user system communication problems, voice network 604 failure, etc.). Accordingly, in one embodiment, the conference call process may determine whether the target participant user ends their participation in the conference call (Step 870). Alternatively, or additionally, conference bridge 630 may monitor the connections of each participant user 630 to detect an involuntary disconnection (e.g., Step 871, described further below).

In one embodiment of the invention, the conference call process may implement one or more rules to determine whether the participant user voluntarily or involuntarily dropped from the conference call. For example, one or more rules may be stored as software code in a memory device that enables the conference call process to determine the type of disconnection that may have occurred. To do so, in one aspect of the invention, the conference call process may determine the type of device the participant user (i.e., user system 640) used to participate in the call. Based on the type of device, the process may determine whether the participant user ended participation voluntarily (e.g., hung up) or was disconnected. For example, a rule may be established that determines that an involuntary disconnection event occurs when the participant user was using a wireless or IP phone when the user's participation ended before the conference call was completed. On the other hand, another rule may establish that the user voluntarily ended participation in the call when they were using a wireline device. The above rules are intended to be exemplary and different rules and/or automated logic may be implemented with methods and systems consistent with this invention to determine the type of drop off that occurs during a conference call.

If the target participant user voluntarily ends participation in the call (Step 870; YES), conference bridge 630 may generate and provide a participant user termination message to DCS 880 (Step 880). The termination message may include information identifying the target participant user, the participant user's telephone number, a time that the participant user ended participation, and any other type of information bridge 630 may be programmed to provide upon the target participant user terminating their participation in the conference call. DCS 607 may provide the termination message to user 605 through user terminal 612. Alternatively, or additionally, conference bridge 630 may provide the termination message to user 605 through user system 637 and voice network 604.

Following the delivery of the termination message, the conference call process may end for the target participant user. Environment 600 may, however, continue to execute the conference call process for any other remaining participant users and user 605 until the conference call no longer includes any participant users. In one aspect of the invention, the conference call process may continue for participant users 645-1 to 645-N following termination of the call by user 605. Additionally, while the conference call is still established and includes at least one participant user and/or user 605, any participant users (or user 605) may rejoin the call by contacting conference bridge 630 using a predetermined telephone number and/or conference identifier. Alternatively, user 605 may instruct conference bridge 630, through a CBA message generated by DCS 607, to contact a participant user who previously terminated their participation in the call. These processes are described with reference to Steps 871-877.

Referring back to Step 870, if the participant user did not end the call voluntarily (Step 870; NO), the conference call process may determine whether the participant user was dropped from the call involuntarily due to a disconnection event (e.g., diminishing cellular phone communication power, communication line disconnections, power loss, network infrastructure failures, etc.) (Step 871). If the user was not dropped from the call (Step 871; NO), the user continues with participation in the conference call (Step 860). On the other hand, if the participant user was dropped from the call (Step 871; YES), the conference call process determines whether the participant user is a DC user (i.e., a user registered with service center 606 and has access to the services offered by DCS 607) (Step 872). If the user is not a DC user (Step 872; NO), a best effort re-establishment process is performed (Step 873).

In one embodiment of the invention, the best effort re-establishment process may determine the phone number of the device the participant user operated when participating in the conference call. Using that number, the best effort re-establishment process may leverage conference bridge 630 to call the number in an attempt to re-establish communications with the participant user. If communications are not re-established with the participant user (Step 874; NO), the process repeats communication attempts for a predetermined number of times before proceeding to Step 880. If, however, communications is re-established with the participant user (Step 874; YES), the conference call process may query the participant user whether they wish to be reconnected or dropped from the conference call (Step 875). If the user wishes to end participation (Step 875; YES), the process proceeds to Step 880. If the user wishes to continue participation in the call (Step 875; NO), the process returns to Step 860.

Referring back to Step 872, in the event the participant user is a DC user (Step 872; YES), the conference call process may perform a DC user re-establishment process (Step 876). In this process, the profile for the participant user is accessed from DCS 607 to determine, among other things, the user's preferred device list, the telephone or contact numbers for each preferred device. Further, the DC user re-establishment process may collect information from DCS 607 indicating whether the user desires to be automatically contacted during a conference call drop event (i.e., if the user was disconnected during a conference call). The conference call process uses the collected profile information to attempt to re-establish communications with the participant user through the user's preferred device. If one device does not work, the process may attempt communications with another preferred device. If communication is not established after exhausting the desired profile communication contact techniques (Step 877; NO), the conference call process proceeds to Step 880. If, however, communications was re-established with the participant user (Step 877; YES), the process continues at Step 875.

It should be noted that the conference call process determines the participant user's preferred device at the time of participation in the conference call. For example, consider an exemplary scenario where a participant user is participating in a conference call using a wireless device while traveling in a vehicle to a place of employment (i.e., their office). If the participant user is dropped from the conference call (or the user hangs up when they arrive at their place of employment), the user may access DCS 607 to reassign their preferred device (or reprioritize) to their office wireline device. Accordingly, DCS 607 may attempt to re-connect with the user through the user's office wireline device. Alternatively, if DCS 607 unsuccessfully attempts to re-connect the participant user to the conference call through the wireless device used during the call prior to drop off, DCS 607 may be configured to call the user's office wireline device. Accordingly, DCS 607 determines a DC participant user's preferred device based on either the device used by the user during the conference call, or through the user's profile registered with DCS 607.

Conference Call Transcription Processes

In addition to establishing and maintaining conference calls, methods and systems consistent with certain aspects related to the present invention enable voice communications during a conference call to be recorded and transcribed. In one aspect of the invention, conference bridge 630 may independently collect audio information from each channel of a conference call (i.e., audio signals received from each user system 640-1 to 640-N that are participating in a conference call). Bridge 630 may route the collected audio information to speech recognition server 650, which converts the audio information to speech information. Conference bridge 630 may directly route the audio information to server 650 or indirectly route the signals through back end servers 620 or other components of environment 600. Speech recognition server 650 may create a transcript of text data from the speech information that identifies each speaker (i.e., user 645-1 to 645-N and user 605) based on the speaker's communication connection established between voice network 604 and the speaker's corresponding user system 640-1 to 640-N. Speech recognition server 650 may also synchronize the transcript using time data that is encoded in the recorded audio information provided by conference bridge 630. In one aspect of the invention, speech recognition server 650 stores any audio information that cannot be converted to text data as audio files. Server 650 may insert pointers to the audio files in an appropriate location of the transcript. Thus, speech recognition server 650 may create a transcript that includes a sequence of text data that corresponds to the conversations between participant users 645-1 to 645-1 and user 605 during a conference call. The transcript may include, at some temporal based location in the transcript where text data could not be converted, a pointer to one or more audio files that includes non-converted audio information corresponding to a speaker that was talking during that moment in time reflected in the transcript.

Speech recognition server 650 may be configured to store the transcript in one or more storage devices located within server 650 or external to server 650, such as a storage device associated with database 555. Further, speech recognition server 650 may format the transcript into a file that is provided to user 605's email address included in DCS 607. Alternatively, speech recognition server 650 may allow subscriber user 605 to access the stored transcript through service center 606.

Ad Hoc Conferencing

Figure 9:
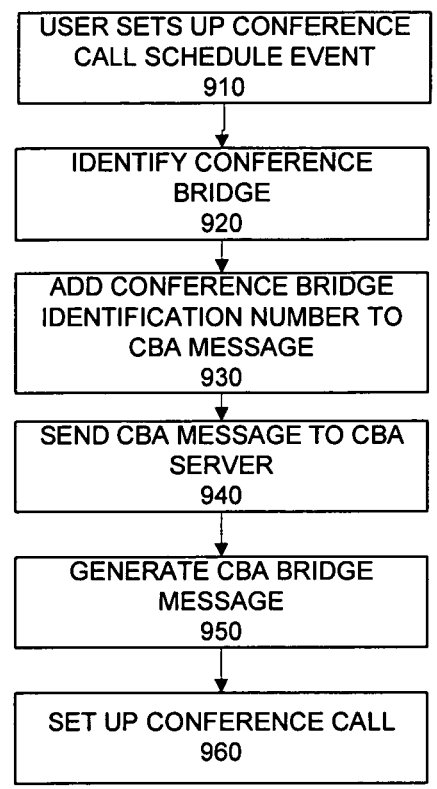
FIG. 9 is a flowchart of an exemplary ad-hoc conference call process consistent with the present invention.

Methods and systems consistent with certain embodiments of the present invention allow user 605 to set up conference call scheduling events that system 600 uses to configure subsequent conference calls. In another embodiment, system 600 may also enable user 605 to configure a conference call to take place immediately, or nearly immediately, following user 605's request. FIG. 9 show a flowchart of an exemplary ad-hoc conference call process that may be performed by system 600 consistent with certain aspects of the invention. Using the ad-hoc conference call process, user 605 may leverage DCS 607 to create a conference call "on the fly" such that DCS 607 does not monitor a scheduling application (e.g., calendar application) to detect a scheduling event. In other words, user 605 may set up a scheduling event to take place at the time user 605 requests a conference call (Step 910).

When setting up a conference call scheduling event "on the fly," user 605 may access service center 606 through user terminal 612 to establish a conference call with participant users 645-1 to 645-N. In one aspect, user 605 may access DCS 607 to identify one or more participant users 645-1 to 645-N. For example, user 605 may access an address book that includes a list of participant users from which user 605 may select to participate in a conference call. This may be performed, for example, by highlighting one or more participant users listed in a menu displayed to user 605 via user interface 612. Alternatively, or additionally, user 605 may designate one or more participant users 645-1 to 645-N that are not included in the list. In this instance, user 605 may provide DCS 607 with contact information (e.g., telephone numbers, IP addresses, etc.) corresponding to each designated participant user.

Once user 605 selects and/or designates target participant users to be included in a conference call, DCS 607 automatically sets up and initiates the conference call. In one embodiment, DCS 607 may also identify a conference bridge that may be used to establish and facilitate the conference call (Step 920). For example, user 605 may have a profile entry registered with DCS 607 that identifies a conference bridge for user 605. Accordingly, DCS 607 may determine whether that conference bridge is available for use when user 605 initiates a request for a conference call. If the bridge is available, DCS collects the bridge identification number for user 605's designated bridge and adds the number to a generated CBA message that further includes the contact information for the target participant users designated by user 605. On the other hand, if the designated bridge is not available, or user 605 does not have a designated bridge, DCS 607 may searches for and temporarily assigns a conference bridge to user 605 for the duration of the conference call requested by user 605. In one embodiment, DCS 607 may search a pool of conference bridges maintained in a database for an available bridge that may be used to facilitate the requested conference call.

Once an available conference bridge (e.g., conference bridge 630) is identified, DCS 607 collects and adds a bridge identification number corresponding to the available bridge to the CBA message (Step 930). DCs 607 then sends the CBA message to CBA server 610 (Step 940). Once received, CBA server 610 extracts the contact information and bridge identification number and creates a CBA bridge message in a manner consistent with the process described in connection with Step 740 of FIG. 7 (Step 950). CBA server 610 then sends the CBA bridge message to the available conference bridge 630, which uses commands included in the CBA message to set up the conference call requested by user 605 in a manner consistent with the processes previously described in connection with Steps 750 and 760 of FIG. 7 (Step 960).

Accordingly, methods and systems consistent with certain embodiments of the present invention enable user 605 to set up a conference call to take place immediately following the time when user 650 initiates the call request. These embodiments allow user 605 to select participant users 645-1 to 645-N and allow system 600 to automatically configure and establish the conference call at the time user 605 requests a conference call with the selected participant users.

Conclusion

While the present invention has been described in connection with various embodiments, many modifications will be readily apparent to those skilled in the art. One skilled in the art will also appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. Accordingly, embodiments of the invention are not limited to the above described embodiments and examples, but instead is defined by the appended claims in light of their full scope of equivalents.

What is claimed is:

1. A method for providing a conference call, comprising:
    creating, by a subscriber user on a user terminal, a conference call event in a calendar application;
    automatically configuring a conference call based on the conference call event;
    identifying, without user intervention, participant users associated with the conference call event;
    notifying the subscriber user that the conference call has been configured;
    contacting the participant users at the time and date of the conference call event;
    providing the participant users with one or more options for declining the conference call, the one or more options including an option for declining participant users to specify a period of time to delay the conference call, wherein the declining participant users are contacted again for the conference call after the specified period of time expires;
    receiving responses from the participant users accepting or declining the conference call;
    establishing the conference call among the accepting participant users and the subscriber user based on the received responses;
    receiving, from the declining participant users, selections of one or more of the options for declining the conference call;
    recording audio information associated with the subscriber user and the participant users' participation during the conference call;
    converting at least some of the audio information to text information; and
    recording the text information in a transcript reflecting a textual temporal based representation of communications that have taken place between the users during the conference call.

2. The method of claim 1, wherein the conference call event is a trigger indicating a proposed conference call previously scheduled by the subscriber user.

3. The method of claim 2, wherein the proposed conference call identifies the participant users and identifying participant users includes:
    collecting an identifier for the participant users from a first data structure corresponding to the conference call event; and
    collecting contact information for the participant users from a second data structure based on the participant user identifiers.

4. The method of claim 3, wherein the first data structure is associated with the calendar application and the second data structure is associated with an address book listing at least the participant users and their corresponding contact information.

5. The method of claim 1, wherein contacting the identified participant users includes:
    collecting contact information associated with the participant users; and
    establishing a communication connection with the participant users using the contact information.

6. The method of claim 5, wherein the contact information comprises telephone numbers associated with the participant users and establishing a communication connection includes:
    dialing out to participant users using a respective telephone number.

7. The method of claim 1, wherein contacting the participant users includes calling the participant users using a telephone number and receiving responses from the participant users includes:
    providing an indication to the subscriber user reflecting whether the participant users answer the conference call.

8. The method of claim 7, wherein providing an indication includes:
    providing a no contact message to the subscriber user when one of the participant users does not answer the conference call.

9. The method of claim 8, further including:
    providing a no conference call message to the subscriber user when none of the participant users answer the conference call.

10. The method of claim 7, wherein providing an indication includes:
    providing one or more acceptance messages to the subscriber user when the participant users answer the conference call.

11. The method of claim 10, wherein providing the acceptance message includes:
    determining whether the participant users accept the conference call.

12. The method of claim 1, wherein the alternatives for communication between the subscriber user and the declining participant users include:
    allowing the participant users to record messages for subsequent play back to the subscriber user,
    allowing the participant users to set alternate telephone numbers for contacting the participant users, and
    allowing the participant users to set periods of time in which the participant users are to be contacted again.

13. The method of claim 1, wherein establishing a conference call includes:
    establishing a communication connection between the participant users and the subscriber user such that the subscriber user and the participant users may conduct a conference call.

14. The method of claim 1, further comprising:
    detecting when one of the participant users terminates its contact during the conference call;
    providing a termination message to the subscriber user indicating that the one participant user has ended participation in the conference call.

15. The method of claim 1, further comprising:
    storing a portion of the audio information that cannot be converted to text information as an audio file; and
    inserting a pointer to the audio file in the transcript.

16. The method of claim 15, further comprising:
    providing the transcript to the subscriber user.

17. The method of claim 15, wherein providing the transcript includes attaching the transcript to an e-mail addressed to the subscriber user.

18. The method of claim 1, wherein contacting the participant users includes:
    determining whether a first one of the participant users has a preferred device registered with a service center, and contacting the first participant user through the preferred device when the first participant user has a registered preferred device.

19. The method of claim 1, wherein the detecting and identifying steps are performed by a digital companion server that provides services to the subscriber user, and wherein contacting the participant users includes:
generating, by the digital companion server, a first message that includes at least instructions for configuring the conference call and telephone numbers for the participant users; and
providing the first message to a conference blasting server.

20. The method of claim 19, wherein providing the first message includes:
generating a second message by the conference blasting server based on the first message, wherein the second message includes instructions for setting up the conference call and the telephone numbers; and
providing the second message to a conference bridge.

21. The method of claim 20, wherein providing the second message includes:
calling, by the conference bridge, the participant users using the telephone numbers included in the second message.

22. The method of claim 1, wherein the subscriber user configures the conference call event by scheduling the conference call in a calendar application for a predetermined date and time and adding the names of the participant users that the subscriber user intends to participate in the conference call.

23. The method of claim 22, comprising receiving input from the subscriber user to add the names of participant users from an address book to the calendar application, the input being received via a graphical user interface.

24. The method of claim 1, further comprising:
detecting when a first one of the participant users was dropped from the conference call; and
determining whether the first participant user has a preferred device registered with a service center.

25. The method of claim 24, wherein when the first participant user has a registered preferred device,
attempting to contact the first participant user through the preferred device.

26. The method of claim 25, further comprising:
re-establishing the first participant user with the conference call based on a determination that the first participant user wishes to continue participation in the conference call.

27. The method of claim 24, wherein when the first participant user does not have a registered preferred device,
determining contact information associated with a device used by the first participant user to participate in the conference call; and
re-establishing the first user with the conference call using the contact information.

28. The method of claim 1, further comprising:
detecting when a first one of the participant users has terminated participation in the conference call;
determining whether the first participant user voluntarily or involuntarily terminated participation in the conference call based on the type of device the first participant user was operating during participation in the conference call: and
contacting the first participant user at a second device that is different from the device the first participant user was operating during participation in the conference call to re-establish the first participant user with the conference call.

29. A method for providing a conference call performed by a server, the method comprising:
creating, by a subscriber user on a user terminal, a conference call event in a calendar application;
automatically configuring the conference call based on the conference call event;
identifying, without user intervention, the participant users associated with the conference call event;
collecting contact information for the participant users;
providing a message including the contact information to a conference server that is configured to instruct a bridge to establish the conference call by calling the participant users using the contact information included in the message;
notifying the subscriber user that the conference call has been configured;
contacting each of the participant users; providing the participant users with one or more options for declining the conference call, the one or more options including an option for declining participant users to specify a period of time to delay the conference call, wherein the declining participant users are contacted again for the conference call after the specified period of time expires;
receiving, from a participant user that declines the conference call, a selection of one or more of the options for declining the conference call;
receiving a response message from the conference server including information associated with the conference call and at least one of the participant users;
recording audio information associated with the subscriber user and the participant users' participation during the conference call;
converting at least some of the audio information to text information; and
recording the text information in a transcript reflecting a textual temporal based representation of communications that have taken place between the users during the conference call.

30. The method of claim 29, wherein detecting a conference call event includes:
scanning the calendar application to determine whether the subscriber user has scheduled the conference call event.

31. The method of claim 30, further including:
determining the participant users from the calendar application;
accessing an address book associated with the subscriber user for collecting the contact information for the participant users; and
generating the message using the collected contact information.

32. The method of claim 29, wherein providing a message includes:
generating the message using the collected contact information and instructions associated with a date for commencing the conference call, and
using the message by the conference server to generate a second message for instructing the bridge to establish the conference call.

33. The method of claim 29, comprising providing the response message by the bridge when attempting to establish communications with the participant users over a voice network.

34. The method of claim 29, wherein the response message comprises at least one of:
information stating that at least one participant user is declining the conference call;

information stating that at least one participant user is not answering the conference call;
information stating that at least one participant user is accepting the conference call; and
none of the participant users is answering the conference call.

35. A method for participating in a conference call automatically established by at least one or more communication entity, the method comprising:
creating, by a subscriber user on a user terminal, a conference call event in a calendar application;
automatically scheduling a conference call at a predetermined time using the calendar application, wherein scheduling includes identifying, without user intervention, participant users that are to participate in the conference call;
receiving, prior to the predetermined time, an indication that a conference call has been configured in accordance with the scheduled conference call;
providing the participant users with one or more options for declining the conference call, the one or more options including an option for declining participant users to specify a period of time to delay the conference call, wherein the declining participant users are contacted again for the conference call after the specified period of time expires;
receiving, after the predetermined time, an indication that at least one participant user has declined to join the conference call, and at least one selection of one or more of the options for declining the conference call;
during the conference call, receiving an indication that another participant user has ended communications with the conference call when that participant user terminates a connection with a bridge that establishes the conference call in accordance with instructions provided by a server that executes the calendar application;
recording audio information associated with the subscriber user and the participant users' participation during the conference call;
converting at least some of the audio information to text information; and
recording the text information in a transcript reflecting a textual temporal based representation of communications that have taken place between the users during the conference call.

36. A method for providing a conference call, comprising:
receiving a message from a first server including instructions for establishing a conference call between participant users and a subscriber user that previously created a conference call event in a calendar application on a second server, wherein the second server automatically initiates configuration of the conference call by providing to the first server contact information for the participant users and the message includes the contact information;
calling the participant users using the contact information included in the message;
providing the participant users with one or more options for declining the conference call, the one or more options including an option for declining participant users to specify a period of time to delay the conference call, wherein the declining participant users are contacted again for the conference call after the specified period of time expires;
receiving responses from the participant users, wherein the responses reflect whether the participant users have answered, accepted, not answered, or declined to accept the conference call, at least one of the responses including a selection of one of the options for declining the conference call;
establishing a conference call between the participant users based on the response received from the participant users;
recording audio information associated with the subscriber user and the participant users' participation during the conference call;
converting at least some of the audio information to text information; and
recording the text information in a transcript reflecting a textual temporal based representation of communications that have taken place between the users during the conference call.

37. A system for providing a conference call, comprising:
a processor;
means for creating, by a subscriber user on a user terminal, a conference call event in a calendar application;
means for automatically configuring a conference call based on the conference call event;
means for identifying, without user intervention, participant users associated with the conference call event;
means for notifying the subscriber user that the conference call has been configured;
means for contacting the participant users at the time and date of the conference call event;
means for providing the participant users with one or more options for declining the conference call, the one or more options including an option for declining participant users to specify a period of time to delay the conference call, wherein the declining participant users are contacted again for the conference call after the specified period of time expires;
means for receiving responses from the participant users accepting or declining the conference call;
means for establishing the conference call among the accepting participant users and the subscriber user based on the received responses;
means for receiving, from the declining participant users, selections of one or more of the options for declining the conference call;
means for recording audio information associated with the subscriber user and the participant users' participation during the conference call;
means for converting at least some of the audio information to text information; and
means for recording the text information in a transcript reflecting a textual temporal based representation of communications that have taken place between the users during the conference call,
wherein at least one of the means runs on the processor.

38. The system of claim 37, wherein the conference call event is a trigger indicating a proposed conference call previously scheduled by the subscriber user.

39. The system of claim 38, wherein the proposed conference call identifies the participant users and the means for identifying participant users includes:
means for collecting identifiers for the participant users from a first data structure corresponding to the conference call event; and
means for collecting contact information for the participant users from a second data structure based on the participant user identifiers.

40. The system of claim 39, wherein the first data structure is associated with the calendar application and the second data structure is associated with an address book listing at least the participant users and their corresponding contact information.

41. The system of claim 37, wherein the means for contacting the identified participant users includes:
   means for collecting contact information associated with the participant users; and
   means for establishing a communication connection with the participant users using the contact information.

42. The system of claim 41, wherein the contact information comprises telephone numbers associated with participant users, and the means for establishing a communication connection includes:
   means for dialing out to participant users using corresponding telephone numbers.

43. The system of claim 37, wherein the means for contacting the participant users includes means for calling the participant users using telephone numbers and the means for receiving responses from the participant users includes:
   means for providing, for the participant users, an indication to the subscriber user reflecting whether a specific one of the participant users answers the conference call.

44. The system of claim 43, wherein the means for providing an indication includes:
   means for providing a no contact message to the subscriber user when one of the participant users does not answer the conference call.

45. The system of claim 44, further including:
   means for providing a no conference call message to the subscriber user when none of the participant users answer the conference call.

46. The system of claim 43, wherein the means for providing an indication includes:
   means for providing one or more acceptance messages to the subscriber user when the participant users answer the conference call.

47. The system of claim 46, wherein the means for providing the acceptance message includes:
   means for determining whether the participant users accept the conference call.

48. The system of claim 37, wherein the options for declining the conference call include:
   allowing the participant users to record messages for subsequent play back to the subscriber user,
   allowing the participant users to set alternate telephone numbers for contacting the participant users, and
   allowing the participant users to set periods of time in which the participant users are to be contacted again.

49. The system of claim 37, wherein the means for establishing a conference call includes:
   means for establishing communication connections between the participant users and the subscriber user, such that the users may conduct a conference call.

50. The system of claim 37, further comprising:
   means for detecting when one of the participant users terminates its contact during the conference call;
   means for providing a termination message to the subscriber user indicating that the one participant user has ended participation in the conference call.

51. The system of claim 37, further comprising:
   means for storing a portion of the audio information that cannot be converted to text information as an audio file; and
   means for inserting a pointer to the audio file in the transcript.

52. The system of claim 51, further comprising:
   means for providing the transcript to the subscriber user.

53. The system of claim 51, wherein the means for providing the transcript comprises means for attaching the transcript to an e-mail addressed to the subscriber user.

54. The system of claim 37, wherein means for contacting the participant users comprises:
   means for determining whether a first one the participant users has a preferred device registered with a service center; and
   means for contacting the first participant user through the preferred device when the first participant user has a registered preferred device.

55. The system of claim 37, wherein the means for detecting and means for identifying steps are performed by a digital companion server that provides services to the subscriber user, and wherein the means for contacting the participant users comprises:
   means for generating, by the digital companion server, a first message that includes at least instructions for configuring the conference call and telephone numbers for the participant users; and
   means for providing the first message to a conference blasting server.

56. The system of claim 55, wherein the means for providing the first message comprises:
   means for generating a second message by the conference blasting server based on the first message, wherein the second message includes instructions for setting up the conference call and the telephone numbers; and
   means for providing the second message to a conference bridge.

57. The system of claim 56, wherein the means for providing the second message includes:
   means for calling, by the conference bridge, the participant users using the telephone numbers included in the second message.

58. The system of claim 37, wherein the subscriber user configures the conference call event by scheduling the conference call in a calendar application for a predetermined time and adding the names of the participant users that the subscriber user intends to participate in the conference call.

59. The system of claim 58, comprising receiving input from the subscriber user to add the names of participant users from an address book to the calendar application, the input being received via a graphical user interface.

60. The system of claim 37, further comprising:
   means for detecting when a first one of the participant users was dropped from the conference call; and
   means for determining whether the first participant user has a preferred device registered with a service center.

61. The system of claim 60, wherein when the first participant user has a registered preferred device,
   means for attempting to contact the first participant user through the preferred device.

62. The system of claim 61, further comprising:
   means for re-establishing the first participant user with the conference call based on a determination that the first participant user wishes to continue participation in the conference call.

63. The system of claim 60, further including
   means for determining contact information associated with a device used by the first participant user to participate in the conference call when the first participant user does not have a registered preferred device; and
   means for re-establishing the first user with the conference call using the contact information.

64. The method of claim 37, further comprising:
means for detecting when a first one of the participant users has terminated participation in the conference call;
means for determining whether the first participant user voluntarily or involuntarily terminated participation in the conference call based on the type of device the first participant user was operating during participation in the conference call; and
means for contacting the first participant user at a second device that is different from the device the first participant user was operating during participation in the conference call to re-establish the first participant user with the conference call.

65. A server for providing a conference call, comprising:
a processor;
means for creating, by a subscriber user on a user terminal, a conference call event in a calendar application;
means for automatically configuring a conference call based on the conference call event;
means for identifying, without user intervention, the participant users associated with the conference call event;
means for collecting contact information for the participant users;
means for providing a message including the contact information to a conference server that is configured to instruct a bridge to establish the conference call by calling the participant users using the contact information included in the message;
means for notifying the subscriber user that the conference call has been configured;
means for contacting each of the participant users;
means for providing the participant users with one or more options for declining the conference call, the one or more options including an option for declining participant users to specify a period of time to delay the conference call, wherein the declining participant users are contacted again for the conference call after the specified period of time expires;
means receiving, from a participant user that declines the conference call, a selection of one or more of the options for declining the conference call;
means for receiving a response message from the conference server including information associated with the conference call and at least one of the participant users;
means for recording audio information associated with the subscriber user and the participant users' participation during the conference call;
means for converting at least some of the audio information to text information; and
means for recording the text information in a transcript reflecting a textual temporal based representation of communications that have taken place between the users during the conference call,
wherein at least one of the means runs on the processor.

66. The system of claim 65, wherein the means for detecting a conference call event comprises:
means for scanning the calendar application to determine whether the subscriber user has scheduled a conference call.

67. The system of claim 65, wherein the means for identifying the participant users further comprises:
means for determining the participant users from the calendar application;
wherein the means for collecting contact information further comprises:
means for accessing an address book associated with the subscriber user for collecting the contact information for the participant users; and
wherein the means for providing a message further comprises:
means for generating the message using the collected contact information.

68. The system of claim 65, wherein the means for providing a message comprises:
means for generating the message using the collected contact information and instructions associated with a time for commencing a conference call previously scheduled by the subscribed user,
wherein the message is used by the conference server to generate a second message for instructing the bridge to establish the conference call.

69. The system of claim 65, wherein the response message is provided by the bridge when attempting to establish communications with the participant users over a voice network.

70. The system of claim 65, wherein the response message reflects at least one of:
at least one participant user is declining the conference call;
at least one participant user is not answering the conference call;
at least one participant user is accepting the conference call; and
none of the participant users is answering the conference call.

71. A system for participating in a conference call automatically established by at least one communication entity, the system comprising:
a processor for executing a program;
means for creating, by a subscriber user on a user terminal, a conference call event in a calendar application;
means for automatically scheduling a conference call for a predetermined date and time using a calendar application, wherein the means for scheduling identifies, without user intervention, participant users that are to participate in the conference call;
means for receiving, on the predetermined date and prior to the predetermined time, an indication that a conference call has been configured in accordance with the scheduled conference call;
means for providing the participant users with one or more options for declining the conference call, the one or more options including an option for declining participant users to specify a period of time to delay the conference call, wherein the declining participant users are contacted again for the conference call after the specified period of time expires;
means for receiving a indication that at least one participant user has declined to join the conference call, and at least one selection of one or more of the options for declining the conference call;
means for receiving, during the conference call, an indication that another participant user has ended communications with the conference call when that participant user terminates a connection with a bridge that establishes the conference call in accordance with instructions provided by a server that executes the calendar application;
means for recording audio information associated with the subscriber user and the participant users' participation during the conference call;
means for converting at least some of the audio information to text information; and means for recording the text information in a transcript reflecting a textual temporal based representation of communications that have taken place between the users during the conference call.

72. A conference bridge for providing a conference call, comprising:
a processor;
means for receiving a message from a first server including instructions for establishing a conference call between participant users and a subscriber user that previously created in a calendar application on a second server, wherein the second server automatically initiates configuration of the conference call by providing to the first server contact information for the participant users and the message includes the contact information;
means for calling the participant users using the contact information included in the message;
means for providing the participant users with one or more options for declining the conference call, the one or more options including an option for declining participant users to specify a period of time to delay the conference call, wherein the declining participant users are contacted again for the conference call after the specified period of time expires;
means for receiving responses from the participant users, wherein the responses reflect whether the participant users have answered, accepted, not answered, or declined to accept the conference call, at least one of the responses including a selection of one of the options for declining the conference call;
means for establishing a conference call between the participant users based on the received responses;
means for recording audio information associated with the subscriber user and the participant users' participation during the conference call;
means for converting at least some of the audio information to text information; and
means for recording the text information in a transcript reflecting a textual temporal based representation of communications that have taken place between the users during the conference call,
wherein at least one of the means runs on the processor.

73. A secondary storage device or a memory including instructions for performing, when executed by a processor, a method for providing a conference call, comprising:
creating, by a subscriber user on a user terminal, a conference call event in a calendar application;
automatically configuring a conference call based on the conference call event;
identifying, without user intervention, participant users associated with the conference call event;
notifying the subscriber user that the conference call has been configured;
contacting the participant users at the time and date of the conference call event;
providing the participant users with one or more options for declining the conference call, the one or more options including an option for declining participant users to specify a period of time to delay the conference call, wherein the declining participant users are contacted again for the conference call after the specified period of time expires;
receiving responses from the participant users accepting or declining the conference call;
establishing the conference call among the participant users and the subscriber user based on the received responses;

receiving, from the declining participant users, selections of one or more of the options for declining the conference call;
recording audio information associated with the subscriber user and the participant users' participation during the conference call;
converting at least some of the audio information to text information; and
recording the text information in a transcript reflecting a textual temporal based representation of communications that have taken place between the users during the conference call.

74. A secondary storage device or a memory including instructions for performing, when executed by a processor, a method for providing a conference call comprising:
creating, by a subscriber user on a user terminal, a conference call event in a calendar application;
automatically configuring a conference call based on the conference call event;
identifying, without user intervention, the participant users associated with the conference call event;
collecting contact information for the participant users;
providing a message including the contact information to a conference server that is configured to instruct a bridge to establish the conference call by calling the participant users using the contact information included in the message;
notifying the subscriber user that the conference call has been configured;
contacting the participant users;
providing the participant users with one or more options for declining the conference call, the one or more options including an option for declining participant users to specify a period of time to delay the conference call, wherein the declining participant users are contacted again for the conference call after the specified period of time expires;
receiving, from a participant user that declines the conference call, a selection of one or more of the options for declining the conference call;
receiving a response message from the conference server including information associated with the conference call and at least one of the participant users;
recording audio information associated with the subscriber user and the participant users' participation during the conference call;
converting at least some of the audio information to text information; and
recording the text information in a transcript reflecting a textual temporal based representation of communications that have taken place between the users during the conference call.

75. A secondary storage device or a memory including instructions for performing, when executed by a processor, a method for participating in a conference call automatically established by at least one communication entity, the method comprising:
creating, by a subscriber user on a user terminal, a conference call event in a calendar application;
automatically scheduling a conference call at a predetermined time using the calendar application, wherein scheduling includes identifying, without user intervention, participant users that are to participate in the conference call;
receiving, prior to the predetermined time, an indication that a conference call has been configured in accordance with the scheduled conference call;

providing the participant users with one or more options for declining the conference call, the one or more options including an option for declining participant users to specify a period of time to delay the conference call, wherein the declining participant users are contacted again for the conference call after the specified period of time expires;

receiving, after the predetermined time, an indication that at least one participant user has declined to join the conference call, and at least one selection of one or more of the options for declining the conference call;

during the conference call, receiving an indication that another participant user has ended communications with the conference call when that participant user terminates a connection with a bridge that establishes the conference call in accordance with instructions provided by a server that executes the calendar application;

recording audio information associated with the subscriber user and the participant users' participation during the conference call;

converting at least some of the audio information to text information; and recording the text information in a transcript reflecting a textual temporal based representation of communications that have taken place between the users during the conference call.

76. A secondary storage device or a memory including instructions for performing, when executed by a processor, a method for providing a conference call, including:

receiving a message from a first server including instructions for establishing a conference call between participant users and a subscriber user that previously created a conference call event in a calendar application on a second server, wherein the second server automatically initiates configuration of the conference call by providing to the first server contact information for the participant users and the message includes the contact information;

calling the participant users using the contact information included in the message;

providing the participant users with one or more options for declining the conference call, the one or more options including an option for declining participant users to specify a period of time to delay the conference call, wherein the declining participant users are contacted again for the conference call after the specified period of time expires;

receiving responses from the participant users, wherein the responses reflect whether the participant users have answered, accepted, not answered, or declined to accept the conference call, at least one of the responses including a selection of one of the options for declining the conference call;

establishing a conference call between the participant users based on the response received from the participant users; and recording audio information associated with the subscriber user and the participant users' participation during the conference call;

converting at least some of the audio information to text information; and recording the text information in a transcript reflecting a textual temporal based representation of communications that have taken place between the users during the conference call.

77. A method for providing a conference call, comprising:

creating, by a subscriber user on a user terminal, a conference call event in a calendar application;

automatically configuring the conference call based on the conference call event;

identifying participant users identified in the request;

notifying the subscriber user that the conference call has been configured;

contacting the participant users;

providing the participant users with one or more options for declining the conference call, the one or more options including an option for declining participant users to specify a period of time to delay the conference call, wherein the declining participant users are contacted again for the conference call after the specified period of time expires;

receiving responses from the participant users accepting or declining the call;

establishing a conference call among the accepting participant users and the subscriber user based on the received responses;

receiving, from the declining participant users, selections of one or more of the options for declining the conference call;

recording audio information associated with the subscriber user and the participant users' participation during the conference call;

converting at least some of the audio information to text information; and recording the text information in a transcript reflecting a textual temporal based representation of communications that have taken place between the users during the conference call, wherein at least one of the contacting, receiving, and establishing steps is performed without user intervention.

\* \* \* \* \*